US009978215B2

(12) United States Patent
Frostick

(10) Patent No.: US 9,978,215 B2
(45) Date of Patent: May 22, 2018

(54) SECONDARY GAMEPLAY FEATURES FOR A COMPUTER-IMPLEMENTED GROUP MATCHING GAME

(71) Applicant: IGT UK Interactive Limited, London (GB)

(72) Inventor: Kevin Frostick, Hemel Hempstead (GB)

(73) Assignee: IGT UK INTERACTIVE LIMITED, London (GB)

( * ) Notice: Subject to any disclaimer, the term of this patent is extended or adjusted under 35 U.S.C. 154(b) by 373 days.

(21) Appl. No.: 14/943,410

(22) Filed: Nov. 17, 2015

(65) Prior Publication Data

US 2016/0148471 A1 May 26, 2016

Related U.S. Application Data

(60) Provisional application No. 62/083,861, filed on Nov. 24, 2014.

(51) Int. Cl.
*A63F 13/00* (2014.01)
*G07F 17/32* (2006.01)

(52) U.S. Cl.
CPC ........ *G07F 17/3267* (2013.01); *G07F 17/323* (2013.01); *G07F 17/3209* (2013.01); *G07F 17/3246* (2013.01); *G07F 17/3251* (2013.01)

(58) Field of Classification Search
CPC ................................................... G07F 17/3267
See application file for complete search history.

(56) References Cited

U.S. PATENT DOCUMENTS

2014/0235338 A1* 8/2014 Hansson ................ G07F 17/32
463/31

* cited by examiner

*Primary Examiner* — Kang Hu
*Assistant Examiner* — Thomas H Henry
(74) *Attorney, Agent, or Firm* — Sage Patent Group

(57) ABSTRACT

Embodiments relate to gaming devices and to techniques for operating such devices in connection with secondary gameplay features of computer-based games. The secondary gameplay may share gameplay features with primary gameplay. In some group-matching games, each game piece includes two characteristics that may affect a display of the game piece in a computer user interface. One characteristic may be used during primary gameplay and another may be used to track when a user has an opportunity for secondary gameplay. For example, a gameplay facility may determine whether the grid includes a set of game pieces having a first characteristic. If so, the gameplay facility may then evaluate each of the game pieces in the set and increment a score based on whether each game piece has a second characteristic. When the score meets or exceeds a threshold, the gameplay facility triggers secondary gameplay.

21 Claims, 9 Drawing Sheets

SECONDARY GAMEPLAY FEATURES FOR A COMPUTER-IMPLEMENTED GROUP MATCHING GAME

CROSS REFERENCE TO RELATED APPLICATIONS

This application claims priority under 35 U.S.C. § 119(e) to U.S. Provisional Application Ser. No. 62/083,861, titled "SECONDARY GAMEPLAY FEATURES FOR A COMPUTER-IMPLEMENTED GROUP MATCHING GAME" and filed on Nov. 24, 2014, which is herein incorporated by reference in its entirety.

FIELD

Embodiments relate to gaming devices, including casino gaming devices such as slot machines or on-line gaming devices, and to techniques for operating such devices in connection with secondary gameplay features of computer-based games that may include wagering.

BACKGROUND

Computers may be used to simulate games played in non-computerized settings, such as poker or chess. Though, computers may also be used to enable play of other games that may only be computer-implemented. Such computer-implemented games may be particularly attractive to some game players because these games provide a game experience that may be difficult for the players to obtain elsewhere. For example, such computer-implemented games may include user interfaces that may be difficult to replicate without a computer. As another example, such computer-implemented games may include a complex gameplay analysis that would be difficult to use in non-computer-implemented games because, for example, the analysis would take so long to perform manually that it would be challenging or improbable to complete during a practical gameplay time period.

Computerized games may also be attractive in a gambling context, such as in wagering games in which players risk money during gameplay for the potential of winning monetary rewards through playing the game. In many gambling contexts, game payouts are dependent on probabilities of events happening within the game, with low-probability events having higher payouts than high-probability events.

Game complexity of non-computer-implemented games has traditionally been limited by the complexity of a probability calculation, in that a game should not be so complex that it would be difficult for a human to calculate the probability during gameplay or include so many potential outcomes or events that the human would find it practically difficult to calculate probabilities of the potential outcomes in advance of gameplay or, during gameplay, recall or look up the probabilities for a particular outcome/event.

SUMMARY

In one embodiment, there is provided a video gaming device of an entertainment system adapted to play a wagering game that offers potential monetary rewards in exchange for wagers. The video gaming device comprises at least one slot by which to accept payment of a monetary amount, at least one processor, and at least one non-transitory computer-readable storage medium having encoded thereon executable instructions that, when executed by the at least one processor, cause the at least one processor to carry out a method. The method comprises operating the video gaming device to carry out acts of receiving payment of a monetary amount through the at least one slot of the video gaming device, generating credits in the video gaming device based on the monetary amount, and, in response to receiving user input comprising an amount of a wager for the wagering game, communicating the amount of the wager via at least one network to at least one computing device of the entertainment system. The amount of the wager is at least a portion of the credits generated based on the monetary amount. The method further comprises, in response to determining that an arrangement of game pieces in a grid includes a first set of game pieces that includes at least a threshold number of game pieces, each having a first characteristic, that are disposed adjacent to one another in a chain in the grid, removing the first set of game pieces from the grid, and awarding a first amount of a monetary reward based at least in part on the wager and the number of game pieces included in the first set. The method further comprises evaluating the first set of game pieces to determine how many game pieces of the first set have a second characteristic, updating a second characteristic score based on a result of the evaluating, and, in response to determining that the second characteristic score meets or exceeds a threshold score, removing a second set of game pieces from the grid at least in part by removing from the grid all game pieces in a first row or column of the grid, and awarding a second amount of the monetary reward based at least in part on a number of game pieces included in the second set of game pieces. The method further comprises communicating a total amount of monetary reward to the at least one other computing device of the entertainment system.

In another embodiment, there is provided an apparatus for operation with an entertainment system to play a wagering game that offers potential monetary rewards in exchange for wagers. The apparatus comprises at least one processor and at least one non-transitory computer-readable storage medium having encoded thereon executable instructions that, when executed by the at least one processor, cause the at least one processor to carry out a method. The method comprises, in response to receiving user input comprising an amount of a wager for the wagering game, communicating the amount of the wager via at least one network to at least one computing device of the entertainment system, and, in response to determining that an arrangement of game pieces in a grid includes a first set of game pieces that includes at least a threshold number of game pieces, each having a first characteristic, that are disposed adjacent to one another in a chain in the grid, removing the first set of game pieces from the grid, and awarding a first amount of a monetary reward based at least in part on the wager and the number of game pieces included in the first set. The method further comprises evaluating the first set of game pieces to determine how many game pieces of the first set have a second characteristic, updating a second characteristic score based on a result of the evaluating, and, in response to determining that the second characteristic score meets or exceeds a threshold score, removing a second set of game pieces from the grid at least in part by removing from the grid all game pieces in a first row or column of the grid, and awarding a second amount of the monetary reward based at least in part on a number of game pieces included in the second set of game pieces. The method further comprises communicating a total amount of monetary reward via the at least one network to the at least one computing device of the entertainment system.

In a further embodiment, there is provided at least one non-transitory computer-readable storage medium having encoded thereon executable instructions that, when executed by at least one processor, cause the at least one processor to carry out a method for operation with an entertainment system to play a wagering game that offers potential monetary rewards in exchange for wagers. The method comprises, in response to receiving user input comprising an amount of a wager for the wagering game, communicating the amount of the wager via at least one network to at least one computing device of the entertainment system, and, in response to determining that an arrangement of game pieces in a grid includes a first set of game pieces that includes at least a threshold number of game pieces, each having a first characteristic, that are disposed adjacent to one another in a chain in the grid, removing the first set of game pieces from the grid and awarding a first amount of a monetary reward based at least in part on the wager and the number of game pieces included in the first set. The method further comprises evaluating the first set of game pieces to determine how many game pieces of the first set have a second characteristic, updating a second characteristic score based on a result of the evaluating, and, in response to determining that the second characteristic score meets or exceeds a threshold score, removing a second set of game pieces from the grid at least in part by removing from the grid all game pieces in a first row or column of the grid, and awarding a second amount of the monetary reward based at least in part on a number of game pieces included in the second set of game pieces. The method further comprises communicating a total amount of monetary reward via the at least one network to the at least one computing device of the entertainment system.

In another embodiment, there is provided a method for operation with an entertainment system to play a wagering game that offers potential monetary rewards in exchange for wagers, wherein the wagering game includes a plurality of game pieces arranged in a grid. The method comprises, in response to receiving user input comprising an amount of a wager for the wagering game, communicating the amount of the wager to at least one computing device of the entertainment system, and, in response to determining that an arrangement of game pieces in the grid includes a first set of game pieces that includes at least a threshold number of game pieces, each having a first characteristic, that are disposed adjacent to one another in a chain in the grid, removing the first set of game pieces from the grid and awarding a first amount of a monetary reward based at least in part on the wager and the number of game pieces included in the first set. The method further comprises evaluating the first set of game pieces to identify game pieces of the first set having a second characteristic, updating a second characteristic score based on a result of the evaluating, and, in response to determining that the second characteristic score meets or exceeds a threshold score, removing a second set of game pieces from the grid at least in part by removing from the grid all game pieces in a first row or column of the grid, and awarding a second amount of the monetary reward based at least in part on a number of game pieces included in the second set of game pieces. The method further comprises communicating a total amount of monetary reward to the at least one computing device of the entertainment system.

In a further embodiment, there is provided a video gaming device of an entertainment system adapted to play a wagering game that offers potential monetary rewards in exchange for wagers. The video gaming device comprises a gaming display, at least one slot by which to accept payment of a monetary amount, at least one processor, and at least one non-transitory computer-readable storage medium having encoded thereon executable instructions that, when executed by the at least one processor, cause the at least one processor to carry out a method. The method comprises operating the video gaming device to carry out acts of receiving payment of a monetary amount through the at least one slot of the video gaming device, generating credits in the video gaming device based on the monetary amount and, in response to receiving user input comprising an amount of a wager for the wagering game, communicating the amount of the wager via at least one network to at least one computing device of the entertainment system. The amount of the wager is at least a portion of the credits generated based on the monetary amount. The method further comprises controlling the gaming display of the video gaming device to display a grid of game pieces. Each game piece in the grid is associated with one characteristic from a first set of characteristics and with either a second characteristic or a third characteristic, and each characteristic of the first set of characteristics, the second characteristic, and the third characteristic has a different effect on a display of game pieces in the grid in the gaming display. The method further comprises, in response to determining that an arrangement of game pieces in the grid includes a first set of game pieces that includes at least a threshold number of game pieces, each having a first characteristic, that are disposed adjacent to one another in a chain in the grid, the first characteristic being one of the first set of characteristics that affect display of the game pieces, removing the first set of game pieces from the grid, wherein removing the first set of game pieces comprises controlling the gaming display to present a first animation associated with removal of each game piece of the first set, and awarding a first amount of a monetary reward based at least in part on the wager and the number of game pieces included in the first set. The method further comprises evaluating each game piece of the first set of game pieces that were removed from the grid to determine which game pieces of the first set have the second characteristic and which game pieces of the first set have the third characteristic, updating a second characteristic score based on a first number of the game pieces of the first set that have the second characteristic, determined in the evaluating, and updating a third characteristic score based on a second number of the game pieces of the first set that have the third characteristic, determined in the evaluating. The method further comprises, in response to determining that the second characteristic score meets or exceeds a threshold score and the third characteristic score does not meet or exceed the threshold score, removing a second set of game pieces from the grid at least in part by removing from the grid all game pieces in a first row or column of the grid, wherein removing the second set of game pieces comprises controlling the gaming display to present a second animation associated with removal of game pieces of the second set, and awarding a second amount of the monetary reward based at least in part on a number of game pieces included in the second set of game pieces. The method further comprises, in response to determining, with the at least one processor, that the third characteristic score meets or exceeds the threshold score and that the second characteristic score does not meet or exceed the threshold score, removing a third set of game pieces from the grid at least in part by removing from the grid all game pieces in a second row or column of the grid, wherein removing the third set of game pieces comprises controlling the gaming display to present a third animation associated with removal of game pieces of the third set, and awarding a third amount of monetary reward based at least in part on a number of game pieces included in the third set of game pieces. The method further comprises, in response to determining that both the second characteristic score and the third characteristic score meet or exceed the threshold score, removing a randomly-selected set of game pieces from the grid, wherein removing the randomly-selected set of game pieces comprises controlling the gaming display to present a fourth animation associated with removal of game pieces of the randomly-selected set, and awarding a fourth amount of monetary reward based at least in part on a number of game pieces included in the randomly-selected set of game pieces. The method further comprises communicating a total amount of monetary reward to the at least one other computing device of the entertainment system.

In another embodiment, there is provided an apparatus for operation with an entertainment system to play a wagering game that offers potential monetary rewards in exchange for wagers. The apparatus comprises at least one processor and at least one non-transitory computer-readable storage medium having encoded thereon executable instructions that, when executed by the at least one processor, cause the at least one processor to carry out a method. The method comprises, in response to receiving user input comprising an amount of a wager for the wagering game, communicating the amount of the wager via at least one network to at least one computing device of the entertainment system. The method further comprises, in response to determining that an arrangement of game pieces in a grid includes a first set of game pieces that includes at least a threshold number of game pieces, each having a first characteristic, that are disposed adjacent to one another in a chain in the grid, the first characteristic being one of a first set of characteristics that affect a display of the game pieces, the first set of characteristics comprising a plurality of characteristics, and each game piece being associated with a characteristic of the first set of characteristics, removing the first set of game pieces from the grid, and awarding a first amount of a monetary reward based at least in part on the wager and the number of game pieces included in the first set. The method further comprises evaluating each game piece of the first set of game pieces that were removed from the grid to determine which game pieces of the first set have a second characteristic and which game pieces of the first set have a third characteristic, wherein game pieces have either the second characteristic or the third characteristic and the second characteristic and third characteristic have a different effect on display of game pieces, updating a second characteristic score based on a first number of the game pieces of the first set that have the second characteristic, determined in the evaluating, and updating a third characteristic score based on a second number of the game pieces of the first set that have the third characteristic, determined in the evaluating. The method further comprises, in response to determining that the second characteristic score meets or exceeds a threshold score and the third characteristic score does not meet or exceed the threshold score, removing a second set of game pieces from the grid at least in part by removing from the grid all game pieces in a first row or column of the grid, and awarding a second amount of the monetary reward based at least in part on a number of game pieces included in the second set of game pieces. The method further comprises, in response to determining that the third characteristic score meets or exceeds the threshold score and that the second characteristic score does not meet or exceed the threshold score, removing a third set of game pieces from the grid at least in part by removing from the grid all game pieces in a second row or column of the grid, and awarding a third amount of monetary reward based at least in part on a number of game pieces included in the third set of game pieces. The method further comprises, in response to determining that both the second characteristic score and the third characteristic score meet or exceed the threshold score, removing a randomly-selected set of game pieces from the grid, and awarding a third amount of monetary reward based at least in part on a number of game pieces included in the randomly-selected set of game pieces. The method further comprises communicating a total amount of monetary reward via the at least one network to the at least one computing device of the entertainment system.

In a further embodiment, there is provided at least one non-transitory computer-readable storage medium having encoded thereon executable instructions that, when executed by at least one processor, cause the at least one processor to carry out a method for operation with an entertainment system to play a wagering game that offers potential monetary rewards in exchange for wagers. The method comprises, in response to receiving user input comprising an amount of a wager for the wagering game, communicating the amount of the wager via at least one network to at least one computing device of the entertainment system. The method further comprises, in response to determining that an arrangement of game pieces in a grid includes a first set of game pieces that includes at least a threshold number of game pieces, each having a first characteristic, that are disposed adjacent to one another in a chain in the grid, the first characteristic being one of a first set of characteristics that affect a display of the game pieces, the first set of characteristics comprising a plurality of characteristics, and each game piece being associated with a characteristic of the first set of characteristics, removing the first set of game pieces from the grid, and awarding a first amount of a monetary reward based at least in part on the wager and the number of game pieces included in the first set. The method further comprises evaluating each game piece of the first set of game pieces that were removed from the grid to determine which game pieces of the first set have a second characteristic and which game pieces of the first set have a third characteristic, wherein game pieces have either the second characteristic or the third characteristic and the second characteristic and third characteristic have a different effect on display of game pieces, updating a second characteristic score based on a first number of the game pieces of the first set that have the second characteristic, determined in the evaluating, and updating a third characteristic score based on a second number of the game pieces of the first set that have the third characteristic, determined in the evaluating. The method further comprises, in response to determining that the second characteristic score meets or exceeds a threshold score and the third characteristic score does not meet or exceed the threshold score, removing a second set of game pieces from the grid at least in part by removing from the grid all game pieces in a first row or column of the grid, and awarding a second amount of the monetary reward based at least in part on a number of game pieces included in the second set of game pieces. The method further comprises, in response to determining, with the at least one processor, that the third characteristic score meets or exceeds the threshold score and that the second characteristic score does not meet or exceed the threshold score, removing a third set of game pieces from the grid at least in part by removing from the grid all game pieces in a second row or column of the grid, and awarding a third amount of monetary reward based at least in part on a number of game pieces included in the third set of game pieces. The method further comprises, in response to determining that both the second characteristic score and the third characteristic score meet or exceed the threshold score, removing a randomly-selected set of game pieces from the grid, and awarding a third amount of monetary reward based at least in part on a number of game pieces included in the randomly-selected set of game pieces. The method further comprises communicating a total amount of monetary reward via the at least one network to the at least one computing device of the entertainment system.

In another embodiment, there is provided a method for operation with an entertainment system to play a wagering game that offers potential monetary rewards in exchange for wagers, wherein the wagering game includes a plurality of game pieces arranged in a grid. The method comprises, in response to receiving user input comprising an amount of a wager for the wagering game, communicating the amount of the wager to at least one computing device of the entertainment system. The method further comprises, in response to determining that an arrangement of game pieces in the grid includes a first set of game pieces that includes at least a threshold number of game pieces, each having a first characteristic, that are disposed adjacent to one another in a chain in the grid, the first characteristic being one of a first set of characteristics that affect a display of the game pieces, the first set of characteristics comprising a plurality of characteristics, and each game piece being associated with a characteristic of the first set of characteristics, removing the first set of game pieces from the grid, and awarding a first amount of a monetary reward based at least in part on the wager and the number of game pieces included in the first set. The method further comprises, evaluating each game piece of the first set of game pieces that were removed from the grid to identify which game pieces of the first set have a second characteristic and which game pieces of the first set have a third characteristic, wherein game pieces have either the second characteristic or the third characteristic and the second characteristic and third characteristic have a different effect on display of game pieces, updating a second characteristic score based on a first number of the game pieces of the first set that have the second characteristic, determined in the evaluating, and updating a third characteristic score based on a second number of the game pieces of the first set that have the third characteristic, determined in the evaluating. The method further comprises, in response to determining that the second characteristic score meets or exceeds a threshold score and the third characteristic score does not meet or exceed the threshold score, removing a second set of game pieces from the grid at least in part by removing from the grid all game pieces in a first row or column of the grid, and awarding a second amount of the monetary reward based at least in part on a number of game pieces included in the second set of game pieces. The method further comprises, in response to determining, with the at least one processor, that the third characteristic score meets or exceeds the threshold score and that the second characteristic score does not meet or exceed the threshold score, removing a third set of game pieces from the grid at least in part by removing from the grid all game pieces in a second row or column of the grid, and awarding a third amount of monetary reward based at least in part on a number of game pieces included in the third set of game pieces. The method further comprises, in response to determining that both the second characteristic score and the third characteristic score meet or exceed the threshold score, removing a randomly-selected set of game pieces from the grid, and awarding a third amount of monetary reward based at least in part on a number of game pieces included in the randomly-selected set of game pieces. The method further comprises communicating a total amount of monetary reward to the at least one computing device of the entertainment system.

The foregoing is a non-limiting summary of the invention, which is defined only by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
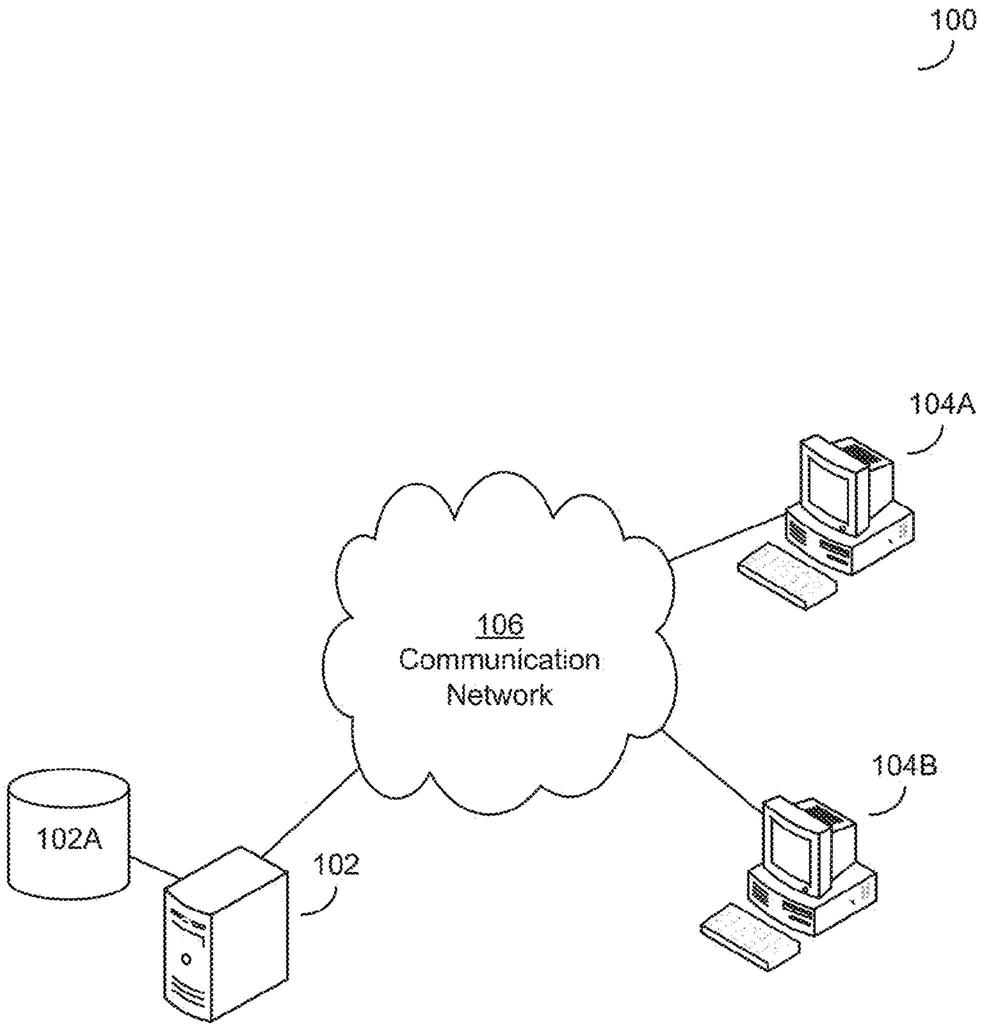
FIG. 1A is an illustration of an example of a computing environment in which some embodiments may operate.

Techniques described herein relate to secondary gameplay features of computer-implemented games. For example, specific examples of secondary gameplay features for particular types of computer-implemented group-matching games are described below. In some of the examples set forth below, the secondary gameplay of a computer-implemented group-matching game shares gameplay features with the primary gameplay of the group-matching game.

By offering the ability to perform complex probability calculations and determine payouts that are dependent on those complex probability calculations, computers enable far more complex wagering games to be played. Such complex, computer-implemented wagering games, based on more detailed and complex probabilities, can provide much higher payouts than non-computer-implemented games in which a payout determination is limited by the ability of a human to practically perform computations during a gameplay time period.

Though, the value of a computer to a gambling context may be much more than simply performing calculations quickly. The computer may offer additional benefit through the integration by the computer of much more complex randomness calculations into a game than could be practically provided through simple casts of dice and other manual ways of inserting randomness into a game. (It should be appreciated that, herein, any discussion of random calculations or selections equally applies to pseudorandom calculations or selections unless indicated otherwise.)

Computer-implemented games take a very wide variety of forms. One category of games that are integrated with computer implementation are group-matching games, in which during gameplay a user and/or a software facility evaluates a set of game pieces to identify groups of matching pieces.

The inventor has recognized and appreciated the advantages of one type of group-matching game in which a gameplay facility (e.g., implemented using any suitable form of software) executing on a computing device displays in a user interface a grid to be populated with game pieces, randomly generates a set of game pieces, and displays the random set of game pieces in the grid. In accordance with the group matching of this game, during gameplay the gameplay facility automatically scans the grid for a set of game pieces that are arranged in a way that meets criteria. Various criteria may be used in this type of game. For example, criteria for of game pieces to be assigned to a set may be that the game pieces be adjacent to one another in the grid and share a particular characteristic, such as a visual characteristic of the pieces like a shape or color with which the game pieces are displayed. In this game, when a set of game pieces meets the criteria, the gameplay facility removes the identified game pieces from the grid and inserts new, randomly-selected game pieces into the grid. The gameplay facility may award payouts based on a number of game pieces in each set that meets the criteria, and on a number of sets that meet the criteria. The random generation of game pieces initially positioned in the grid, and the random selection of game pieces to be newly inserted following removal of a set, may be valuable for player interaction, but may also increase the complexity of the probability calculation for determining payouts based on likelihoods of the set(s) occurring in a grid. As discussed above, increasing the complexity of the probability allows for a corresponding increase in the monetary rewards that may be offered to a player.

The inventor has recognized and appreciated that group-matching games may benefit from introduction of secondary gameplay features into the games. In some secondary gameplay, upon satisfaction of a condition during normal gameplay a user may be given a chance at winning a surplus prize. For example, upon triggering a secondary gameplay, a user may receive a payout based on a result of another probability calculation. The inventor has recognized and appreciated that secondary gameplay may be more desirable to some players when closely linked to normal gameplay, such as using the same interface and including the same game pieces.

The inventor has therefore recognized and appreciated the advantages of a computer-implemented group matching game that includes a secondary gameplay including features that are similar to features of a primary gameplay of the group-matching game. In many games, secondary gameplay is different from primary gameplay, such as by using different pieces and a different game environment (e.g., game board). Such differences create variation that users may desire. However, the inventor has recognized that sharing gameplay features between primary and secondary gameplay may be lead to a secondary gameplay that is easier for a user to learn and play.

In one example of secondary gameplay sharing gameplay features with primary gameplay, in the context of a group-matching game, the secondary gameplay could use a same grid and same game pieces as the primary gameplay of the group-matching game.

A grid and pieces could be used in various ways for primary and secondary gameplay, but the inventor has identified a particularly advantageous way of using a same grid and pieces for primary and secondary gameplay. In particular, in some group-matching games that include both primary and secondary gameplay, each of the game pieces includes at least two characteristics, both of which may affect a manner in which each game piece is displayed in a computer user interface. Of the two characteristics, one may be used during primary gameplay and another may be used to track when a user has an opportunity for secondary gameplay. For example, a gameplay facility may evaluate a grid of game pieces to determine whether the grid includes a set of game pieces having a first characteristic. If so, the gameplay facility may then evaluate each of the game pieces in the set and increment a score based on whether each game piece has a second characteristic. When the score meets or exceeds a threshold, the gameplay facility triggers secondary gameplay.

The inventor has recognized and appreciated that a number of different secondary gameplay options may be used with such group-matching games, but that one manner of secondary gameplay may be particularly advantageous. Such a group-matching game may, during primary gameplay, remove game pieces from a grid and award game points for the game pieces when a set of the game pieces meet one or more criteria, such being arranged in a certain manner in the grid and sharing a first characteristic. In one secondary gameplay identified by the inventor, a score may be maintained for removed game pieces (e.g., game pieces removed during primary gameplay) having a second characteristic. In response to the score meeting or exceeding a threshold, the computer may remove an entire column or row of game pieces of the grid and award game points for the removed pieces. In addition, as one potential extension to this secondary gameplay, when a row or column is to be removed, the computer may evaluate game pieces within the row/column to determine whether any of the game pieces have the second characteristic. If so, in addition the computer may remove from the grid, and award game points for, all other game pieces within a threshold radius of those game pieces.

In still another particularly advantageous implementation of such secondary gameplay, the game pieces may include some game pieces having a second characteristic and some pieces having a different, third characteristic. In such an embodiment, the third characteristic may be treated the same as or similarly to the foregoing discussion of the second characteristic, with respect to calculating a score during primary gameplay and comparing that score to a threshold. The inventor has also recognized and appreciated that, in embodiments that include such a second and a third characteristic, it would be advantageous to include a gameplay feature that is triggered when scores for the second and the third characteristic meet or exceed a threshold. For example, during this bonus gameplay feature of the secondary gameplay, a randomly-selected set of game pieces may be removed and award game points for the removed game pieces.

Described below are various examples of secondary gameplay features that may be coupled with computer-implemented group matching games, including in a gambling context, such as for a wagering game. Examples of specific video gaming devices and entertainment systems with which embodiments may operate are also described. It should be appreciated that embodiments are not limited to operating in accordance with any of the specific examples given below.

FIG. 1A illustrates an example of a computer environment 100 in which some embodiments may operate. Environment 100 includes a computing device 102 that may be operated by a game management entity, such as an owner of a game and/or the party financial responsible for paying winnings of the and collecting losses of a game incurred by players. The computing device 102 may be implemented in any suitable manner, including as a set of one or more servers or other devices, and may execute a server gameplay facility to perform server-side functions of a game. The device 102 may additionally include a data store 102A of information regarding the game, which may include information on past wins/losses of one or more players. In some embodiments, a server gameplay facility may monitor the past wins/losses of players to ensure that a win/loss ratio over a period of time meets a desired win/loss ratio. The ratio may be any suitable ratio, including one set by government or industry oversight entities that have jurisdiction over the game management entity. The data store 102A may additionally include other information regarding a game, such as player information like financial account information (e.g., credit card information or bank account information), player identifying information like names and addresses, or other information.

The computer environment 100 also includes computing devices 104A, 104B that may be operated by human players to play the game. While illustrated in FIG. 1A as personal computers, it should be appreciated that embodiments are not limited to operating with personal computers. Any suitable devices may be used as a device by which a player interacts with a game, other examples of which are discussed below in connection with FIGS. 1B-1D. In some embodiments, however, the computing devices 104A, 104B may execute a client gameplay facility by which the player interacts with the game. In some embodiments, the client gameplay facility may be implemented in one or more webpages that the computing devices 104A, 104B may download from the computing device 102. In other embodiments, the client gameplay facility may be implemented as a standalone application executing on a computing device 104A, 104B, such as a mobile "app." The application may have been downloaded from device 102 or from a third-party. In still other embodiments, the client gameplay facility may be implemented in other manners, as embodiments are not limited in this respect.

The computing device 102 may be connected to the computing devices 104A, 104B in any suitable manner, including via one or more wired and/or wireless communication networks 106. In some embodiments, the network 106 may be a wired and/or wireless local area network, while in other embodiments the network 106 may include a wide area network, including the Internet.

Figure 1B:
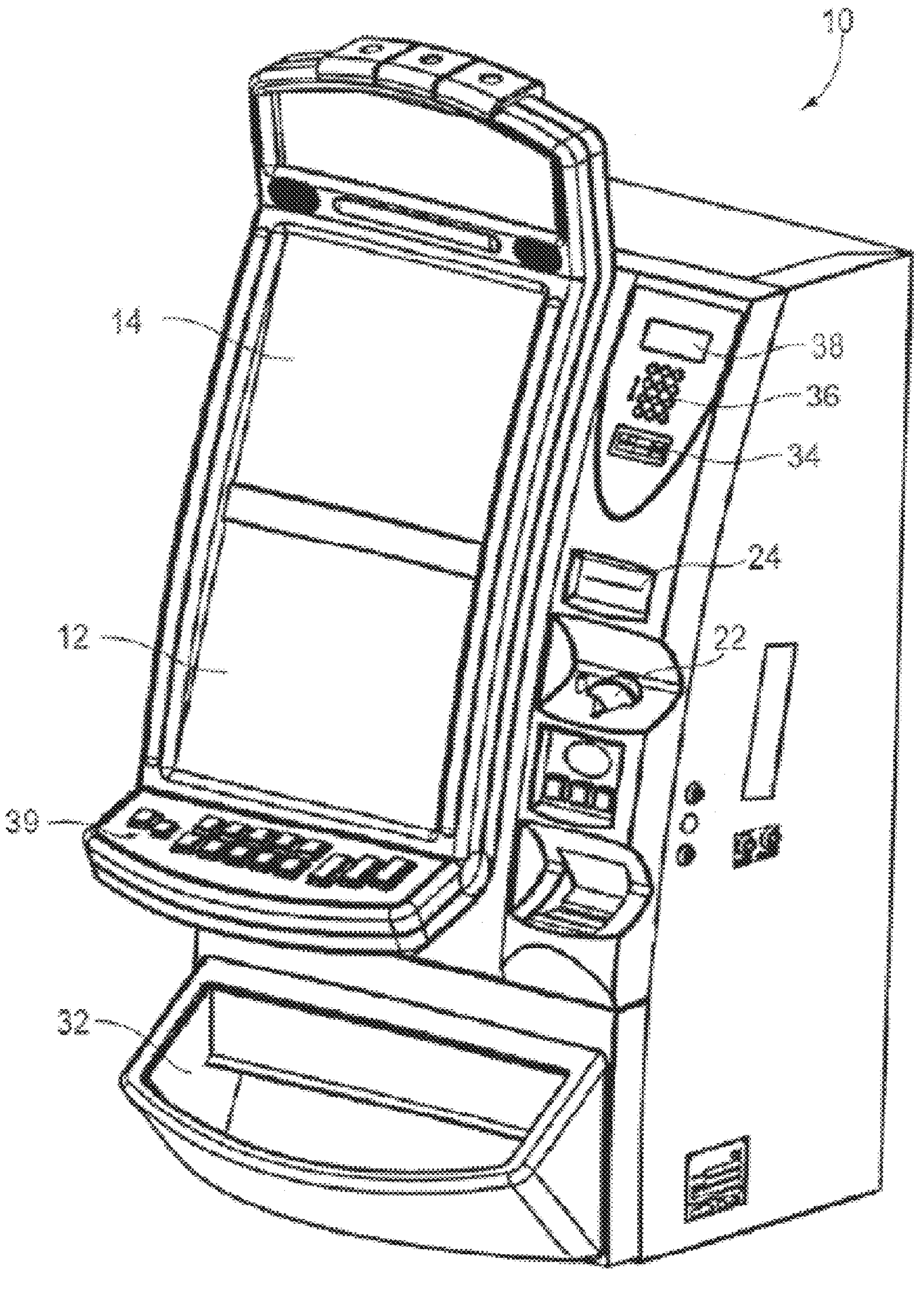
FIG. 1B is an illustration of an example of a computing device with which some embodiments may operate.

FIG. 1B shows a perspective view of an exemplary cabinet housing a casino game machine 10 that may be implemented as the computing device 104A of FIG. 1A in accordance with some embodiments. Exemplary cabinet game machine 10, as depicted in FIG. 1B, includes a display 12, a second display 14, a coin slot 22, a coin tray 32, a card reader slot 34, a keypad 36, and player control buttons 39.

Display 12 may include at least one three-dimensional (3D) display for displaying 3D images of one or more 3D environments (e.g., virtual or real-world 3D environments). Embodiments of the 3D display device may be implemented using any suitable type of display component, including, without limitation, a thin film transistor (TFT) display, a liquid crystal display (LCD), a cathode ray tube (CRT) display, a light-emitting diode (LED) display, and/or an organic LED (OLED) display.

In some embodiments, the 3D display device may be a stereoscopic display, an autostereoscopic display, a holographic display, a volumetric display, a compressive light field display, a side-by-side viewing display, a display with filter arrays, and/or any other suitable 3D display. In embodiments where the 3D display device includes an autostereoscopic display, the autostereoscopic display may include any suitable component(s) for directing images to specified viewers or viewing regions, including, without limitation, a parallax barrier, a lenticular lens, and/or an integral imaging array. In embodiments where the 3D display device includes a stereoscopic display, the stereoscopic display may include any suitable viewing device, including, without limitation, any suitable active 3D viewer or passive 3D viewer.

In some embodiments, the 3D display device may display any suitable type of 3D image using any suitable technique, including, without limitation, anaglyph images, polarized projections, autostereoscopic images, computer-generated holograms, volumetric images, infra-red laser projections, auto stereograms, pulfrich effects, prismatic and self-masking crossview glasses, lenticular prints, wiggle stereoscopy, active 3D viewers (e.g., liquid crystal shutter glasses, red eye shutter glasses, virtual reality headsets, personal media viewers, etc.), and/or passive 3D viewers (e.g., linearly polarized glasses, circularly polarized glasses, interference filter technology glasses, complementary color anaglyphs, compensating diopter glasses for red-cyan method, ColorCode 3D, ChromaDepth method and glasses, Anachrome compatible color anaglyph method, etc.). In some embodiments, the 3D display device may comprise a display manufactured by SeeFront GmbH.

Second display 14 may provide game data or other information in addition to the information provided by display 12. Display 14 may provide static information, such as an advertisement for the game, the rules of the game, pay tables, pay lines, and/or other information, and/or may even display the main game or a bonus game along with display 12. Alternatively, the area for display 14 may be a display glass for conveying information about the game. In some embodiments, display 12 may include a camera for use, for example, in generating and/or displaying autostereoscopic 3D images.

Display 12 and/or display 14 may have a touch screen lamination that includes a transparent grid of conductors. A player touching the screen may change the capacitance between the conductors, and thereby the X-Y location of the touch on the screen may be determined. A processor within cabinet 10 may associate this X-Y location with a function to be performed. There may be an upper and lower multi-touch screen in accordance with some embodiments.

The casino game machine 10 may include one or more inputs and/or input devices (which may be referred to herein as a "reading device") to receive an instrument supplied by a player for conveying a monetary amount. For example, the reading device may include an optical reader, a magnetic/inductive reader, or other type of reader. In some cases, the casino game machine 10 may include a slot by which to receive an instrument.

In some embodiments, the inputs may include a coin slot 22 that may accept coins or tokens in one or more denominations to generate credits within the casino game machine for playing games. An input slot 24 for an optical reader and printer may receive machine readable printed tickets and may output printed tickets for use in cashless gaming.

The casino game machine 10 may also include a coin tray 32 may receive coins or tokens from a hopper (not shown) upon a win or upon the player cashing out. While not explicitly illustrated in FIG. 1B, the casino game machine 10 may further include a banknote detector and a slot through which to receive banknotes in one or more denominations to generate credits within the casino game machine for playing games. The casino game machine may further include a slot by which to output banknotes from a reserve of banknotes (not shown) upon a win or upon the player cashing out.

However, in some embodiments, the casino game machine may not pay in cash, but may only issue a printed ticket for cashing in elsewhere. Alternatively, a stored value card may be loaded with credits based on a win, or may enable the assignment of credits to an account associated with a computer system, which may be a computer network-connected computer system.

In some embodiments, the inputs may include a card reader slot 34 that may accept any of various types of cards, such as smart cards, magnetic strip cards, and/or other types of cards conveying machine readable information. The card reader may read the inserted card for player and/or credit information for cashless gaming. The card reader may read a magnetic code on a conventional player tracking card, where the code uniquely identifies the player to the host system. The code may be cross-referenced by the host system to any data related to the player, and such data may affect the games offered to the player by the casino game machine. The card reader may also include an optical reader and printer for reading and printing coded barcodes and other information on a paper ticket.

A card may also include credentials that enable the host system to access one or more accounts associated with a user, which may be accounts with the casino game machine or with an entertainment system of which the casino game machine is a part, and/or accounts with a financial institution such as a bank or issuer of a credit card. In a case that an account is associated with a financial institution, the casino game machine may generate credits within the casino game machine and/or within an account of the casino game machine for playing games, based on an amount charged by a user to the financial institution account. The account with the casino game machine/system may be debited based on wagers by a user, and credited based on a win.

The casino gaming machine may operate with any suitable type of card with the card reader slot 34 or printing/issuing a card for payout. The card may include a magnetic strip, an RFID tag, an electronic chip, an electronic display (such as an electrophoretic display) that displays a bar code or other identifier, or other electronically-readable card. As discussed above, the card may be associated with credentials, such as credentials for an account with the casino game machine or with an entertainment system of which the casino game machine is a part, and/or accounts with a financial institution.

A keypad 36 may accept player input, such as a personal identification number (PIN) and/or any other player information. A display 38 above keypad 36 may display a menu for instructions and/or other information, and/or may provide visual feedback of the keys pressed. The keypad 36 may be an input device such as a touchscreen, or dynamic digital button panel, in accordance with some embodiments.

Player control buttons 39 may include any buttons and/or other controllers usable for the play of the particular game or games offered by the casino game machine, including, for example, a bet button, a repeat bet button, a spin reels (or play) button, a maximum bet button, a cash-out button, a display pay lines button, a display payout tables button, select icon buttons, and/or any other suitable button(s). In some embodiments, buttons 39 may be replaced by a touch screen with virtual buttons. In some embodiments, touchless control gesture functionality may replace or coexist with buttons 39.

Although embodiments have been described in which a 3D display device is included in a cabinet 10 housing a casino game machine, some embodiments are not limited in this manner. Some embodiments may be implemented using any suitable 3D display device, whether standing alone or included in another device (e.g., a 3D television, a mobile computing device, a head-mounted display, a cabinet housing a casino game machine 10, or any other suitable device).

Figure 1C:
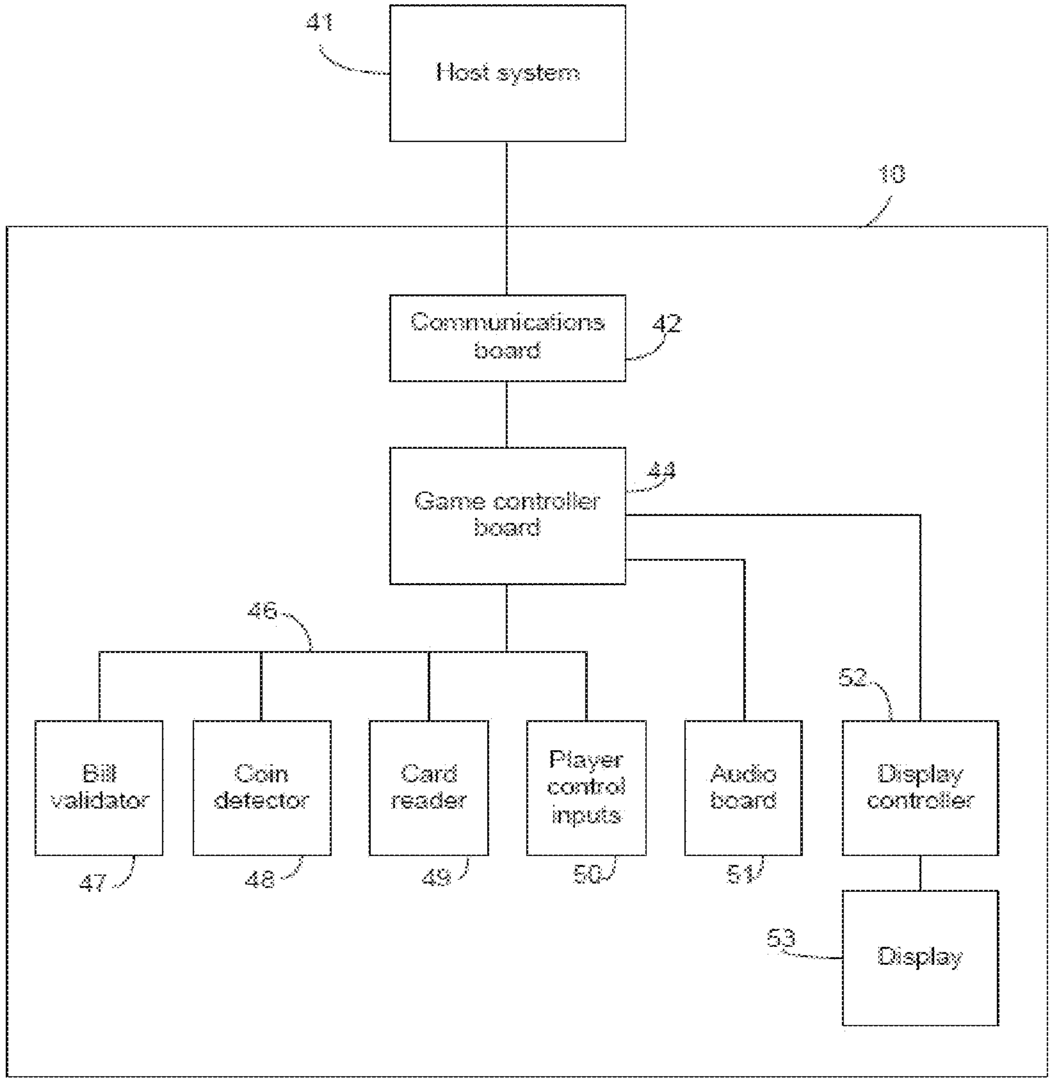
FIG. 1C is a block diagram of some examples of components of a computing device with which some embodiments may operate.

FIG. 1C is a block diagram of an exemplary casino game machine 10 (such as may be housed in the exemplary cabinet shown in FIG. 1B) linked to a casino's host system 41, in accordance with some embodiments. In the example shown, a communications board 42 may contain circuitry for coupling the casino game machine 100 to a local area network (LAN) and/or other type of network using any suitable protocol, such as the G2S protocols. Internet protocols are typically used for such communication under the G2S standard, incorporated herein by reference. Communications board 42 may transmit using a wireless transmitter, and/or may be directly connected to a network running through the casino (e.g., throughout the casino floor). Communications board 42 may set up a communication link with a master controller and may buffer data between the network and game controller board 44. Communications board 42 may also communicate with a network server, such as in accordance with the G2S standard, for exchanging information to carry out embodiments described herein.

Game controller board 44 may contain memory and one or more processors for carrying out programs stored in the memory and for providing the information requested by the network. Game controller board 44 may execute programs stored in the memory and/or instructions received from host system 41 to carry out game routines. In some embodiments, game controller board 44 may execute programs stored in the memory and/or instructions received from host system 41 to perform one or more techniques described herein (e.g., techniques for generating 3D images and/or techniques for controlling a 3D display device to display 3D images). In some embodiments, game controller board 44 may execute programs stored in the memory and/or instructions received from host system 41 to perform one or more tasks described herein.

Peripheral devices/boards may communicate with game controller board 44 via a bus 46 using, for example, an RS-232 interface. Such peripherals may include a bill validator 47, a coin detector 48, a smart card reader and/or other type of credit card reader 49, and/or player control inputs 50 (such as buttons 39 and/or a touch screen).

Game controller board 44 may also control one or more devices that produce the game output including audio and video output associated with a particular game that is presented to the user. For example, audio board 51 may convert coded signals into analog signals for driving speakers. Display controller 52 may convert coded signals into pixel signals for one or more displays 53 (e.g., display 12 and/or display 14). Display controller 52 and audio board 51 may be directly connected to parallel ports on game controller board 44. In some embodiments, the electronics on the various boards may be combined in any suitable way, such as onto a single board. Casino game machine 10 may be implemented using one or more computers; an example of a suitable computer is described below.

Figure 1D:
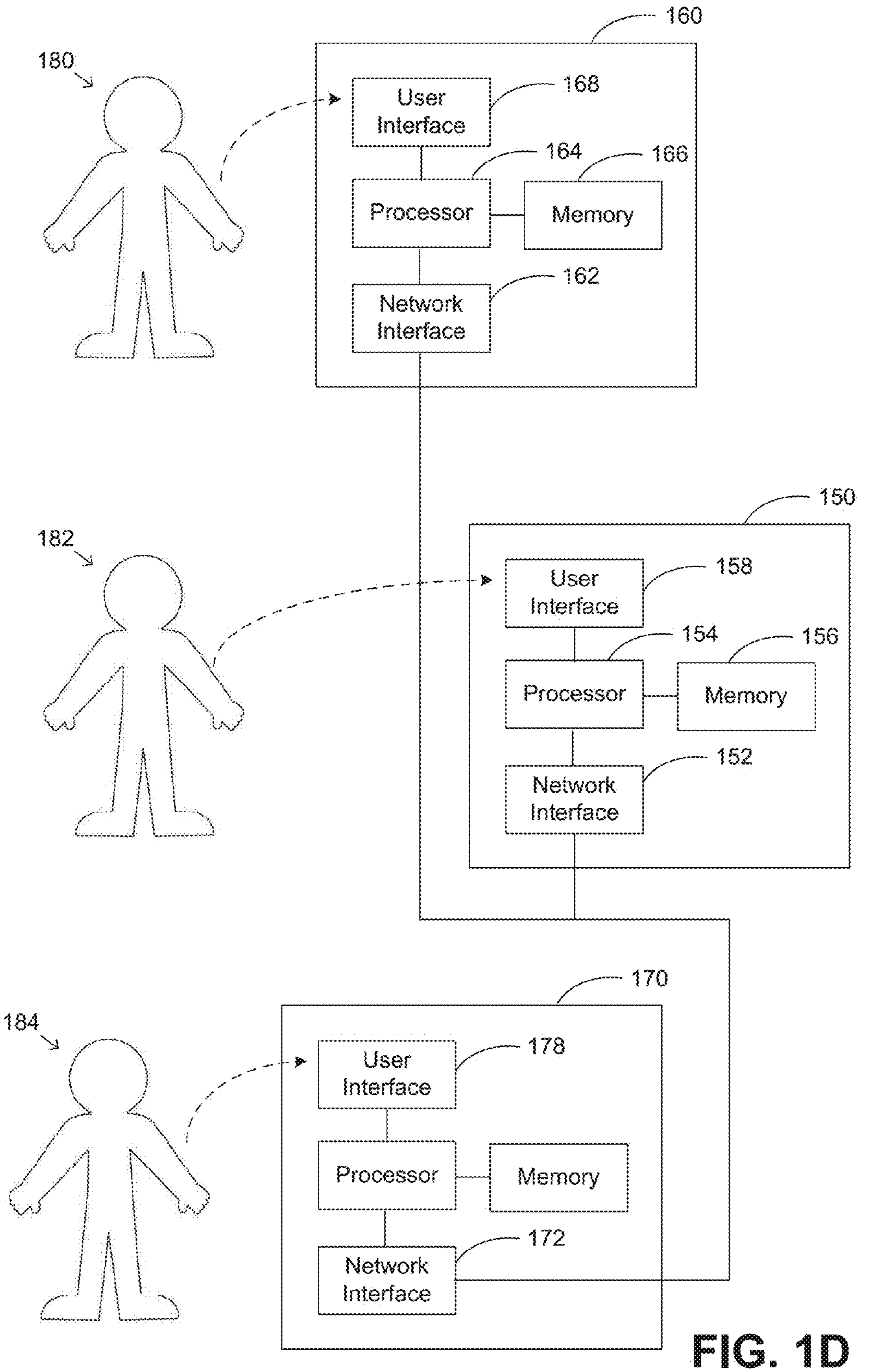
FIG. 1D is a block diagram of some examples of components of a computing environment with which some embodiments may operate.

FIG. 1D illustrates an operating environment including an exemplary control system 160 that may be used in some embodiments to control a casino game machine, such as exemplary casino game machine 10 of FIGS. 1B-1C, in accordance with one or more embodiments. Control system 160 may be implemented in any suitable form, as embodiments are not limited in this respect. For example, control system 160 may be implemented as a single stand-alone machine, or may be implemented by multiple distributed machines that share processing tasks in any suitable manner. Control system 160 may be implemented as one or more computers; an example of a suitable computer is described below.

In some embodiments, control system 160 may include one or more tangible, non-transitory processor-readable storage devices storing processor-executable instructions, and one or more processors that execute the processor-executable instructions to perform one or more tasks and/or processes described herein, including, but not limited to, image-generation tasks and/or processes, display-control tasks and/or processes, etc. The storage devices may be implemented as computer-readable storage media (i.e., tangible, non-transitory computer-readable media) encoded with the processor-executable instructions; examples of suitable computer-readable storage media are discussed below. An example of a suitable storage medium is memory 166 depicted in FIG. 1D, which is operatively connected to processor 164 for executing instructions stored in memory 166. In one example, processor 164 and memory 166 may be a processor and memory contained in game controller board 44, which may provide functionality for operating one or more games on casino game machine 10, in addition to providing control functionality described herein. In another example, processor 164 and/or memory 166 may be separate from game controller board 44 and may assert control signals upon game controller board 44 for affecting the operation of game controller board 44 in operating one or more games on casino game machine 10. When components of control system 160 are separate from components of casino game machine 10 described above, the components of control system 160 may be housed in any suitable location in any suitable configuration, within and/or attached to a cabinet and/or separated therefrom.

Exemplary control system 160 also includes a user interface component 168 configured to allow a user (player) 180 to interact with the casino game machine. User interface component 168 may be implemented in any suitable form, as embodiments are not limited in this respect. In some embodiments, user interface component 168 may be configured to receive input from player 180 in any suitable form, such as by button, touchscreen, touchless control gesture, speech commands, etc., and may be configured to provide output to player 180 in any suitable form, such as audio output and/or visual output on a 2D or 3D display. In one exemplary embodiment, user interface component 168 may include one or more components of casino game machine 10 housed in a cabinet, such as player control inputs 50, audio board 51, display controller 52, and/or displays 53.

FIG. 1D further illustrates an example of a casino environment including a central control system 150 having an interface 152 for wired and/or wireless communication with local control systems for casino game machines 160 and 170 (and possibly other casino game machines) via their respective network interfaces 162 and 172. Exemplary central control system 150 includes one or more processors 154 and memory 156 (e.g., one or more processor-readable storage media) storing processor-executable instructions for causing processor 154 to perform functions such as transmitting control commands to casino game machines 160 and 170. For example, central control system 150 may, through execution by processor 154 of stored program instructions, stream game content to casino game machines 160 and 170 and/or instruct casino game machines 160 and 170 to implement game adjustments selected by central control system 150 at times determined by central control system 150. In various embodiments, gaming functionality may be distributed between central control system 150 and game machine terminals such as 160 and 170 in any suitable way, making use of any suitable division of functionality. For instance, in some exemplary embodiments, central control system 150 may download games to game machine terminals 160 and/or 170, which may execute the game programs including performing random number generation for determining probabilistic symbol outcomes. In other exemplary embodiments, central control system 150 may perform random number generation and execute game programs for game machine terminals 160 and/or 170, which may merely display output (e.g., 3D images) received from central control system 150 and collect user input from users 180 and 180 via user interfaces 168 and 178 for transmission to central control system 150 via the network interfaces. In some embodiments, central control system 150 may have its own user interface 158 for interaction with a user 182. In some embodiments, central control system 150 may also be configured to function as a casino game machine with player interaction capabilities. However, in other embodiments, central control system 150 may simply function as a server providing functions to other casino game machines such as 160 and 170.

Figure 2:
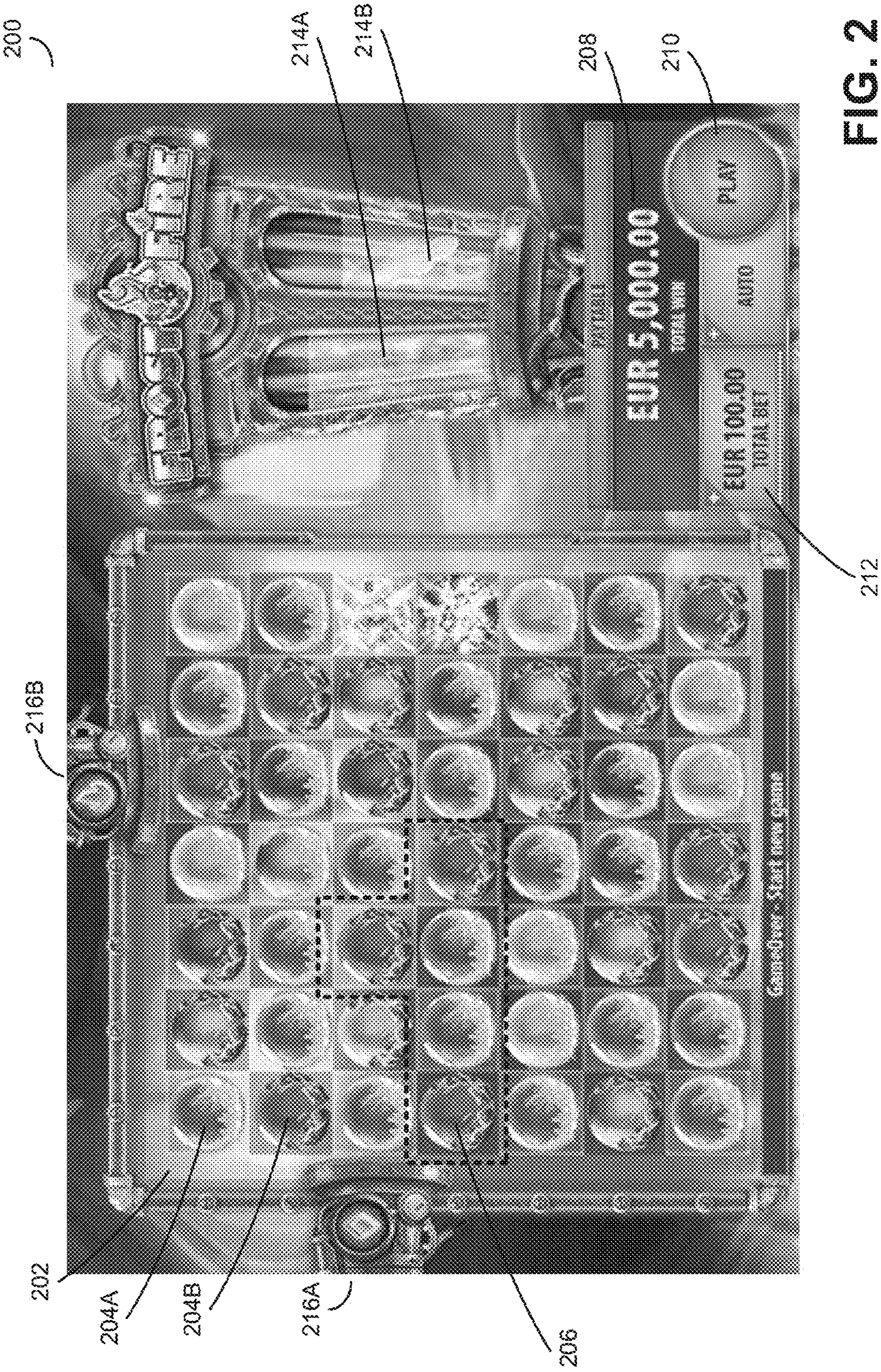
FIG. 2 is an illustration of an example of a user interface that may be implemented in some embodiments.

FIG. 2 illustrates an example of a user interface 200 that may be used in some embodiments for a group matching game including secondary gameplay features. The interface 200 includes a grid 202, including a number of column and a number of rows. The grid may, in some cases, include an equal number of columns and rows, but in other embodiments there may be more columns than rows or vice versa. The grid 202 includes multiples slots (one at each intersection of a column and row) each filled with one of multiple game pieces 204, which include game pieces 204A, 204B. Each of the game pieces 204 of the user interface have a variety of characteristics. The characteristics may be visible characteristics, in that the visible characteristics may affect the display of a game piece in the user interface. The characteristics may also influence gameplay, in that a gameplay facility may analyze the characteristics of each game piece during gameplay, such as to determine whether criteria are met and whether game points are to be awarded.

Any suitable characteristics may be associated with game pieces, as embodiments are not limited in this respect. Each game piece may have visible characteristics such as a shape, graphic or textual marking, color, or graphic accent. In the example of FIG. 2, each of the game pieces has the same shape (circle/sphere) and none include graphic or textual marking. Each game piece has a first characteristic that is piece color, with each game piece having one color from a set of colors (e.g., red, green, blue, orange, purple, etc.). Each game piece additionally has a graphic accent. A graphic accent may be a graphic displayed alongside a game piece, such as a supplemental graphic that is paired with a specific game piece. In embodiments that include graphic accents, only some of the game pieces may include a graphic accent or all of the pieces may include a graphic accent, as embodiments are not limited in this respect. In the example of FIG. 2, all game pieces have a graphic accent that is one of a set of two graphic accents, which are a "frost" accent and a "fire" accent. Both graphic accents are shown as graphics wrapping around the individual game pieces on the bottom and right sides of the game pieces. Piece 204A has a frost accent and piece 204B has a fire accent.

At a start of gameplay, initiated by a player hitting the "play" button 210, a gameplay facility may generate a random assortment of game pieces and display a graphic animation of the game pieces being dropped into the grid 202 from the top side of the grid 202. The gameplay facility may then evaluate the grid 202 to determine whether the arrangement of game pieces in the grid includes one or more sets that meet a criteria. Any suitable criteria may be used, as embodiments are not limited in this respect.

The criteria may relate to characteristics of game pieces of a set, in which case the criteria may relate to any suitable one or more characteristics. The criteria may also relate to a placement or order of game pieces within the grid. For example, in some embodiments game pieces may qualify as a set meeting the criteria when more than a threshold number of game pieces, having a first characteristic in common, are adjacent to one another in the grid. The first characteristic may be any suitable characteristic, such as shape or color of the game pieces or any other suitable characteristic. The gameplay facility may identify adjacent game pieces by evaluating game pieces positioned at slots vertically, horizontally, and/or diagonally next to one another in the grid. In some embodiments, the gameplay facility may identify game pieces as adjacent, in the context of a set, when those game pieces are arranged in a straight line. In other embodiments, the gameplay facility may identify game pieces as adjacent, in the context of a set, when the game pieces are arranged linearly, such as when a line that consists of horizontal and/or vertical lines can be drawn through game pieces without passing through any of the game pieces more than once. In still other embodiments, the gameplay facility may identify game pieces as adjacent, in the context of a set, when the game pieces are positioned in slots that are vertically, horizontally, and/or diagonally contiguous.

In the example of FIG. 2, the gameplay facility evaluates the game pieces to determine whether there is a set of three or more game pieces that are positioned in vertically and/or horizontally contiguous slots and have the same color. A set 206 of game pieces that meet this criteria is indicated in FIG. 2. As discussed in further detail below, when that set is identified a number of game points may be awarded and a game points total 208 may be increased. In a gambling context, the game points may be monetary rewards and the amount of the increase may depend in part on a wager amount 212 input by the player before initiating gameplay.

In accordance with the secondary gameplay principles described herein, in response to identifying a set of game pieces that meets the color and arrangement criteria, the gameplay facility may additionally evaluate the game pieces of the set to determine which have a second characteristic and/or which have a third characteristic. In the specific example of FIG. 2, the gameplay facility evaluates the game pieces to identify those having a "frost" accent and those having a "fire" accent. The gameplay facility may then increase secondary gameplay scores 214A, 214B based on the evaluation, such as incrementing the secondary gameplay scores 214A, 214B based on the number of game pieces having each characteristic. For example, the score 214A may be associated with game pieces having a "frost" accent and the score 214B with those pieces having a "fire" accent. The gameplay facility may increment the score 214A based on a number of game pieces of a set having the "frost" accent and similarly increment the score 214B based on a number of game pieces of a set having the "fire" accent.

In the example of FIG. 2, the scores 214A, 214B may be used to determine whether and when to initiate a secondary gameplay. When either or both of the scores 214A, 214B reach a threshold amount (e.g., filling the displayed meter in the user interface 200), secondary gameplay is initiated. As should be appreciated from the foregoing, embodiments are not limited to any particular form of secondary gameplay. In the example of FIG. 2, two "cannons" 216A, 216B are illustrated in the user interface 200, with cannon 216A associated with "frost" and cannon 216B associated with "fire." When one of the scores 214A, 214B meets or exceeds the threshold, the corresponding cannon "fires" in the user interface 200, which may include displaying in the user interface 200 a graphic animation of a beam of frost or a beam of fire from the corresponding cannon. As a result, a row (in the case of cannon 216A) or a column (in the case of cannon 216B) is removed from the grid and game pieces awarded accordingly. In addition, in some embodiments, when the "frost" cannon 216A fires across a row of the grid 202, the gameplay facility may evaluate game pieces in the row to identify which have the "frost" accent. At each of those identified game pieces, the gameplay facility may display in the user interface 200 a graphic simulating an explosion. The gameplay facility may also remove from the grid all game pieces within a threshold radius of each such game piece and award game points accordingly.

Figure 3:
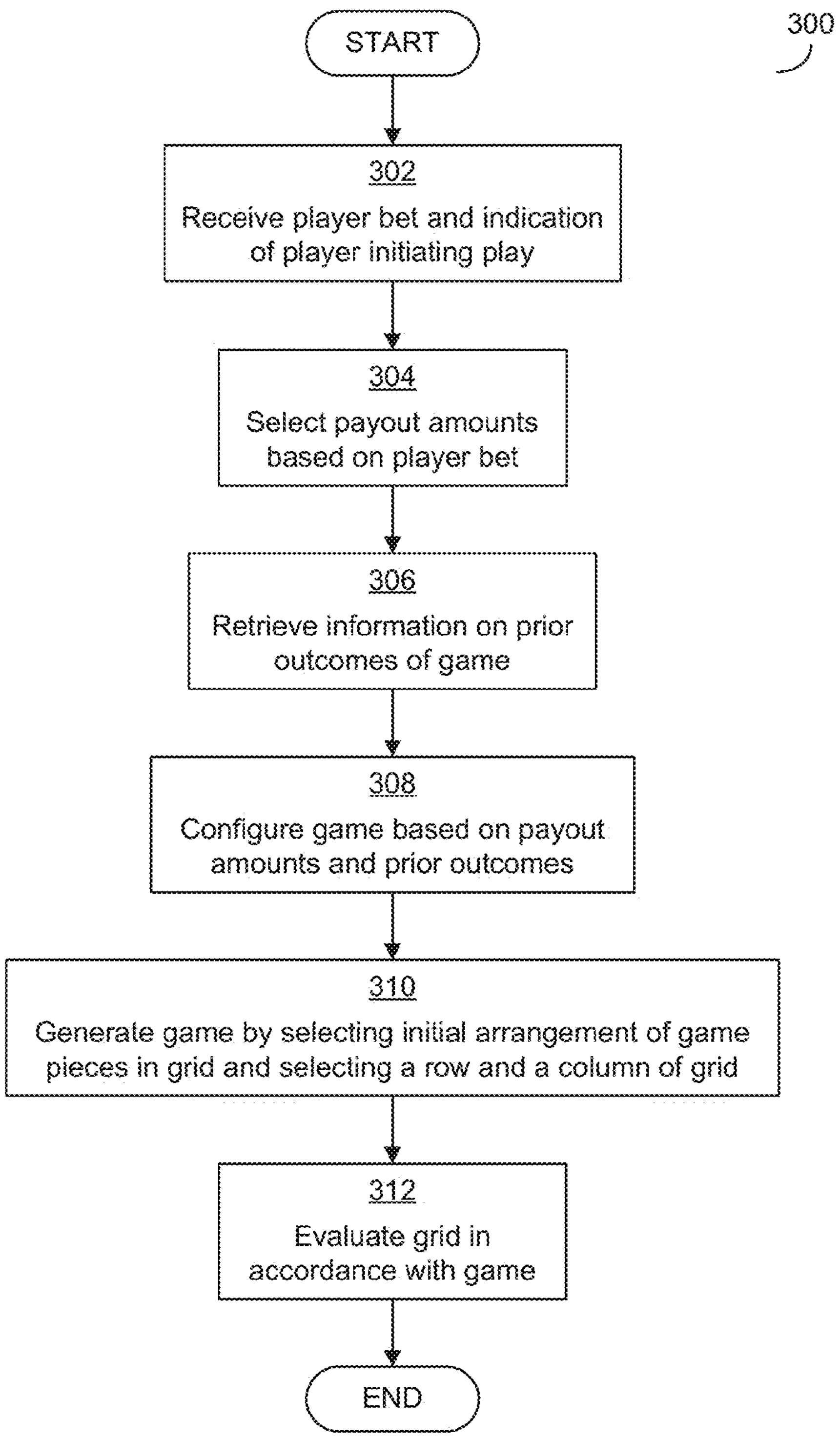
FIG. 3 is a flowchart of a process for initializing gameplay that may be implemented in some embodiments.
Figure 4:
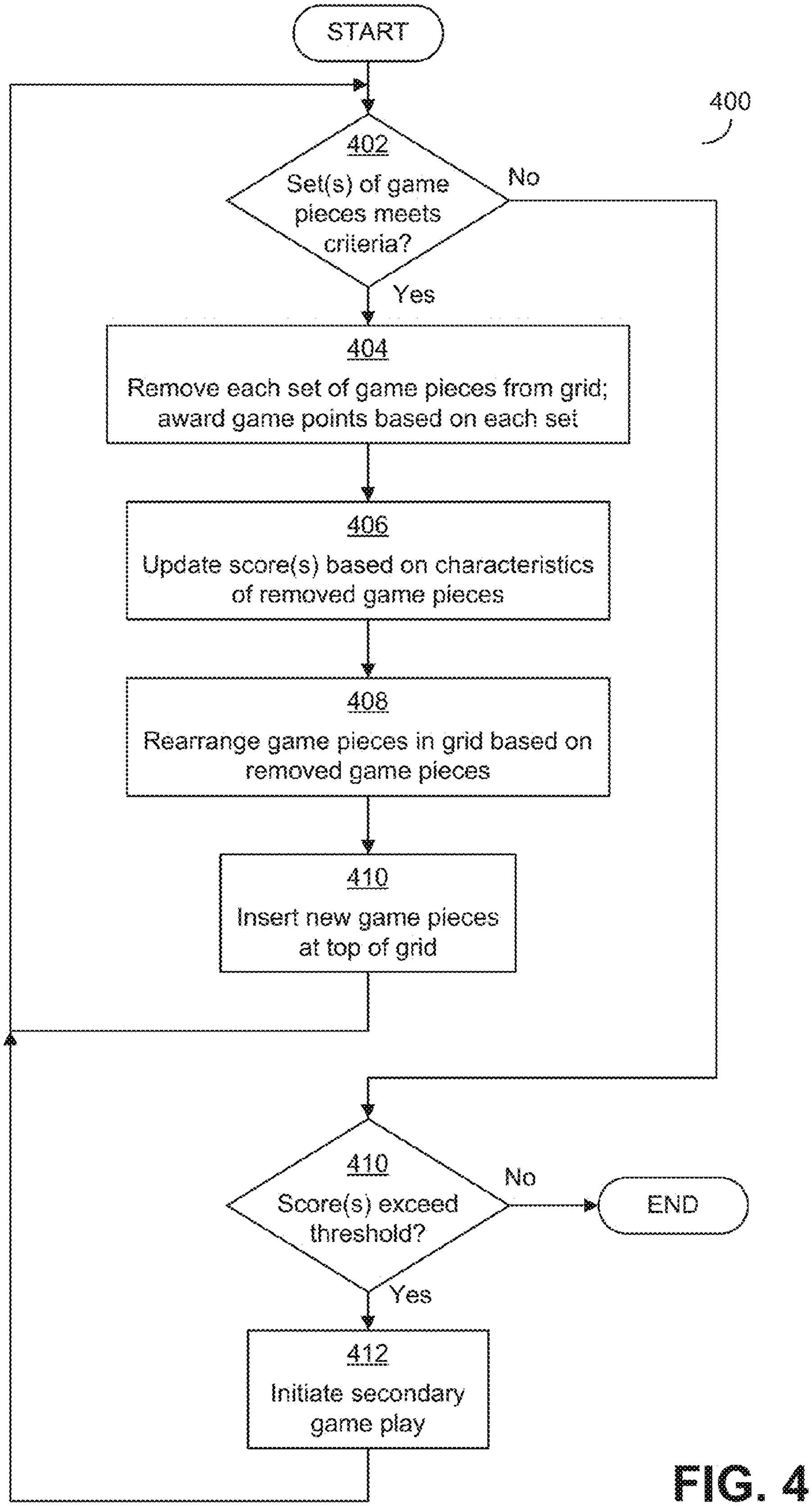
FIG. 4 is a flowchart of a process for performing a normal gameplay of an example of a group matching game that includes a secondary gameplay element, that may be implemented in some embodiments.
Figure 5:
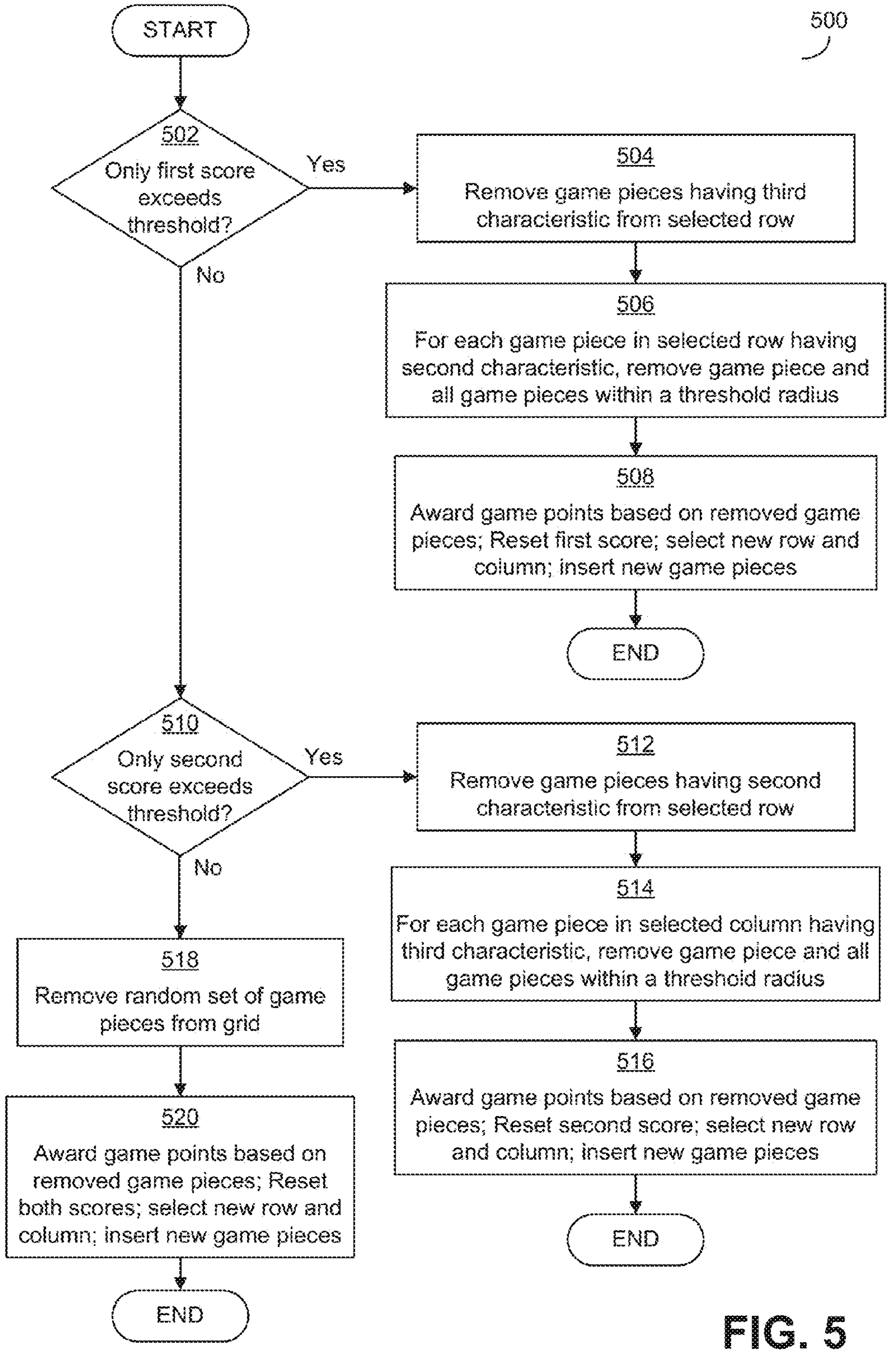
FIG. 5 is a flowchart of a process for performing a secondary gameplay of a group matching game that may be implemented in some embodiments.

FIGS. 3-5 illustrate flowcharts of exemplary processes that may be implemented by a gameplay facility to conduct a game such as the one discussed above in connection with the user interface 200 of FIG. 2. It should be appreciated, however, that embodiments are not limited to implementing any of the exemplary processes discussed below, as other embodiments are possible.

The process 300 of FIG. 3 may be used to initialize gameplay of a game and begin play of the game. Prior to the start of the process 300, an administrator may configure amounts of game points to award in response to various conditions, such as when a set of game pieces is detected to meet a criteria. In the context of a wagering game, the administrator may configure different amounts of game points to award based on different wagers, including in the case where game points are monetary rewards. In addition, the administrator may configure a desired win/loss ratio and/or total wager/payout ratio for the game over a period of time. In some geographic areas, a government or industry body may regulate games in gambling contexts such that games should or must have a certain win/loss ratio over a period of time, or a certain ratio of total payouts to total wagers over a period of time. The ratio configured by the administrator may be an overall ratio for a number of players and a number of games over the period of time, and/or a ratio for a specific player for a number of games over a period of time. Prior to the process 300, in which one game for one player is initiated, a number of other games may have been played by any number of other players, and the gameplay facility may store or have access to a store of results of those games.

The process 300 begins in block 302, in which a gameplay facility receives from a player an amount of a wager and an indication that a user has requested that gameplay begin. In response, in block 304 the gameplay facility selects payout amounts to be awarded to the player during gameplay, in response to each of various conditions being met, based on an amount of the player's wager. For example, the gameplay facility may in some games award, for higher wagers, higher payouts for occurrence of the same events than for lower-value wagers. The gameplay facility may have a table of wagers and payout amounts, configured by the administrator prior to the start of process 300 as discussed above, and select the payout amounts from the table based on an amount of the player's wager. The table may be located on a same computing device as is executing the gameplay facility or another computing device. The gameplay facility may, in some embodiments, transmit, via one or more networks, an amount of the wager to another computing device in response to receiving the wager. That other computing device may use the wager to select the payout amount(s) and return them to the gameplay facility via the network(s). The other computing device may additionally or alternatively store the amount of the wager, such as storing in a record from which a ratio of wagers to payouts or other information may be determined. The other computing device may also obtain the funds from the player in any suitable manner, such as by conducting a funds transfer (e.g., via Automated Clearinghouse (ACH)), charging a credit card, charging a user account with the gambling system, or via any other suitable manner of obtaining funds.

In addition, in block 306 the gameplay facility retrieves from a storage, such as by communicating with another computing device via the network(s), information on prior outcomes of the game. The information on prior outcomes may be information on prior outcomes for this same player and/or prior outcomes for multiple or all players, over any suitable time period. The information on prior outcomes may be any suitable information, as embodiments are not limited in this respect. For example, the information on prior outcomes may be individual results of games, a ratio over the suitable time period, or an indication of a next outcome that, in view of the prior outcomes, should result to aid in ensuring that a desired ratio (e.g., win/loss ratio or total payouts to total wagers ratio, or any other suitable ratio) is met over a period of time.

Following retrieval of the information on prior outcomes in block 306, and the selection of the payout amounts in block 304, in block 308 the gameplay facility may configure the game in block 308. The configuration in block 308 may be carried out in any suitable manner. For example, the gameplay facility may configure itself to award the payout amounts selected in block 304 in response to conditions being met. As another example, the gameplay facility may additionally or alternatively configure itself to award a win in a next iteration, or to make a win more likely to occur by adjusting weighting factors, so as to achieve a desired win/loss ratio over a period of time. As another example, the gameplay facility may additionally or alternatively configure itself to award a particular type of win, that results in a particular award, or to make such a win more likely to occur by adjusting weighing factors, so as to achieve a desired ratio of total payouts to total wagers over a period of time.

Following the configuration of block 308, and in accordance with that configuration, in block 310 the gameplay facility generates a game by selecting an initial arrangement of game pieces in the grid of the game. The facility may select the initial arrangement in any suitable manner, including through a random selection of game pieces or through a weighted random selection that is weighted in accordance with the configuration of block 308, and/or by making a selection in accordance with the configuration of block 308.

In addition, in block 310 the gameplay facility selects a row and a column of the grid. The row and column are selected in block 310 to be used in secondary gameplay, such as in accordance with the operations of "cannons" 216A, 216B discussed above in connection with FIG. 2. The gameplay facility may select the row and column in block 310 randomly, using a weighted random selection, using a weighted selection, and/or otherwise by making a selection in accordance with the configuration of block 308.

In block 312, the gameplay facility evaluates the grid in accordance with the rules of the game. Examples of evaluating the grid are discussed below in connection with FIGS. 4-5. Once the gameplay facility evaluates the grid, the process 300 ends.

FIG. 4 illustrates a flowchart of an example process 400 by which a gameplay facility may evaluate a grid of game pieces during a normal gameplay of a group matching game, such as the one discussed above in connection with FIG. 2. Prior to the start of the process 400, a gameplay facility may be configured with information on prior outcomes of a game and/or with information regarding amount of game points to award in response to conditions being met. In addition, an initial arrangement of game pieces in a grid may be selected, such as via a random or weighted random selection. For example, a process such as the process 300 of FIG. 3 may be carried out prior to the start of the process 400.

Process 400 begins in block 402, in which the gameplay facility evaluates a grid of game pieces to determine whether any of the game pieces meet game criteria to qualify as a set. Any suitable criteria may be used, as embodiments are not limited in this respect. In some embodiments, the criteria may include that a set include more than a threshold (e.g., more than three) game pieces that are adjacent to one another and that share a characteristic. The characteristic may be any suitable characteristic, examples of which are given above in connection with FIG. 2. In some embodiments, each of the game pieces may have one characteristic from a group, such as one color from a group of colors. In some such embodiments, the criteria of block 402 may be that each of the game pieces of the set have a matching characteristic that is a matching color, out of the group of colors.

If in block 402 the gameplay facility identifies one or more such sets of game pieces in the arrangement of game pieces in the grid, then the gameplay facilities moves on to blocks 404-406 to perform processing based on each of those sets of game pieces. In block 404, for each set, the gameplay facility removes the game pieces of the set from the grid and awards a number of game points for the removed game pieces. The removal of the game pieces may include outputting any suitable animation corresponding to the removal. The number of game points that is awarded may be set by the gameplay facility in any suitable manner, including according to configuration settings discussed above in connection with block 308 of FIG. 3. For example, the gameplay facility may award a number of game points based on a number of game pieces included in the set and based on the player's wager, such that more game points are awarded as the number of pieces in a set increases and more game points are awarded as the player's wager increases.

In block 406, for each set, the gameplay facility reviews the game pieces included in the set to determine characteristics of the game pieces and updates one or more characteristic scores accordingly. For example, the gameplay facility may maintain a score based on a number of game pieces that have a particular characteristic. In the example of FIG. 2, each game piece had either a "frost" accent or a "fire"

accent. In such an embodiment, the gameplay facility may maintain a "frost" score and a "fire" score and, in block 406, may evaluate game pieces of each set to determine whether the piece has a "frost" accent or a "fire" accent. In the case that the facility determines that a removed game piece has a "frost" accent, the facility may increase the "frost" score accordingly (and may additionally update a user interface, such as increasing a bar graph showing a current state of the score). The facility may perform similar operations with respect to the "fire" accent and score.

In block 408, the gameplay facility rearranges game pieces in the grid based on the removed game pieces. This may be done in any suitable manner. For example, in some embodiments when one or more game pieces have been removed from a column of the grid, game pieces in that column may be moved downward in the column to fill spaces such that all open spaces in that column are at the top of the column. In block 410, the gameplay facility may insert new game pieces into the grid to fill each of the spaces in the grid. The gameplay facility may select new game pieces to insert into the grid in any suitable manner, including according to techniques described above in connection with block 310 of FIG. 3. Once the new game pieces have been inserted to form a complete grid again following removal of game pieces, the gameplay facility returns to block 402 to evaluate the new grid for set(s) of game pieces that meet the criteria, which the gameplay facility may do in the same manner as the first evaluation in block 402.

The gameplay facility may continue evaluating the grid for set(s) and looping through the operations of blocks 404-410 until the gameplay facility determines in block 402 that the grid does not include any sets of game pieces that meet the criteria. Once the gameplay facility determines that there are no such sets in the grid, the gameplay facility proceeds to block 410 in which it determines whether any of the score(s) maintained through the operations of block 406 meet or exceed a threshold (which may be the same threshold for each score, or different thresholds). To continue the example of FIG. 2, the gameplay facility may determine whether a "frost" score or a "fire" score meets or exceeds a threshold (which may be the same or different thresholds for each score). If neither score exceeds the threshold, then the process 400 ends. Following the process 400, if the player has won a monetary award as a result of the gameplay, the award may be provided to the player. The amount of the win may also be communicated to a computing device, such as one that may perform a payout (e.g., transfer of funds) and/or that tracks a ratio of wins/losses or total payouts to total wagers over time. Following the end of the process 400, the player may also initiate another game if desired.

If, however, one or more scores maintained by the gameplay facility meet or exceed a threshold, then the gameplay facility may trigger a secondary gameplay. Any suitable secondary gameplay may be carried out, as embodiments are not limited in this respect. FIG. 5 describes an example of a secondary gameplay that may be carried out, though embodiments are not limited to implementing this example. Following the secondary gameplay, a new grid may be produced by the gameplay facility and the facility returns to block 402 to evaluate the new grid in the same manner as before.

The exemplary process 500 of FIG. 5 may be implemented by a gameplay facility to implement a secondary gameplay for a group matching game, such as the group matching game of the examples of FIGS. 2 and 4. The process 500 begins in block 502, in which the gameplay facility determines whether only a score for a second characteristic (e.g., a "frost" accent) meets or exceeds a threshold and, accordingly, whether a second score does not meet or exceed a threshold. If so, then in block 504 the gameplay facility removes from the grid all game pieces within a particular row of the grid. As discussed above in connection with FIG. 2, the user interface may include "cannons" and may include animated graphics corresponding to beams of frost or fire shot out of the cannons, with one cannon being associated with a row and one with a column. As discussed above in connection with block 310 of FIG. 3, as part of initiating gameplay a gameplay facility may select the row/column corresponding to such cannons and from which game pieces are to be removed in response to a score meeting or exceeding a threshold. In block 504 of FIG. 5, in response to the first score meeting or exceeding the threshold, game pieces are removed from that selected row and, in some embodiments, the cannon graphical animation may be displayed in the user interface.

In block 506, the gameplay facility evaluates the game pieces in the row to determine which, if any, of the game pieces have a particular characteristic. This may be a characteristic associated with the first score. For example, if the first score is associated with a "frost" accent, the gameplay facility may evaluate the game pieces to determine which of the pieces have the "frost" accent. Then, for each of the game pieces in the row determined to have that characteristic, the gameplay facility removes that game piece and additionally removes from the grid all game pieces within a threshold radius of that game piece. A graphical animation may be displayed associated with the removal of the game pieces within the threshold radius. For example, the game pieces in the row having the characteristic may be displayed with an "explosion" graphic, after which pieces within the threshold radius may be removed. For example, the gameplay facility may additionally remove all game pieces adjacent to each of the game pieces having the characteristic.

In block 508, the gameplay facility awards an additional number of game points for each of the game pieces removed in blocks 504, 506. The gameplay facility then reinitializes the game for normal gameplay. The gameplay facility resets the first score, such as to a zero value, and selects a new column and row of the grid in a manner that may be the same as the selection described above in connection with block 310 of FIG. 3. The gameplay facility may additionally rearrange game pieces in the grid based on the removed pieces and insert new game pieces into the grid, which may be done in a manner similar to that discussed above in connection with blocks 408, 410 of FIG. 4. After reinitializing the game for normal gameplay, the process 500 ends. Following the secondary gameplay of FIG. 5, the gameplay facility may return to a beginning of a normal gameplay procedure, such as discussed above in connection with the outcome of block 412 of FIG. 4.

If the gameplay facility determines in block 502, however, that the first score is not the only score that meets or exceeds a threshold, then in block 510 the gameplay facility determines whether a second score for a third characteristic (e.g., a "fire" accent) is the only score that meets or exceeds a threshold (which may be the same threshold as block 502 or a different threshold). If so, then in blocks 512, 514, 516 the gameplay facility carries out operations similar to those discussed above in connection with blocks 504, 506, 508. For example, the game play facility may remove a column (rather than a row) of game pieces from the grid, which may include displaying a graphical animation (e.g., a cannon animation). In addition, the game play facility may evaluate those game pieces to see which have a characteristic (e.g., a "fire" accent), then additionally remove those game pieces and all game pieces within a threshold radius of those pieces. A graphical animation may be displayed associated with the removal of the game pieces within the threshold radius. For example, the game pieces in the row having the characteristic may be displayed with an "explosion" graphic, after which pieces within the threshold radius may be removed. After this, the gameplay facility may reinitialize the game for normal gameplay. For the sake of brevity, a detailed discussion of the operations of blocks 512, 514, 516 will not be provided herein to the extent that the operations of these portions of the process 500 would be appreciated from the discussion above of blocks 504, 506, 508. Following the operations of block 516, the process 500 ends.

If the gameplay facility determines in block 510, however, that the second score is not the only score that meets or exceeds a threshold, then as a result of the determinations of blocks 502 and 510 (and because the process 500 was triggered by at least one of the scores exceeding a threshold, as discussed above in connection with block 410 of FIG. 4), by process of elimination the gameplay facility determines that both of the scores meet or exceed a threshold. In response, the gameplay facility in block 518 randomly selects a set of one or more game pieces in the grid, which may be at any suitable locations in the grid, and removes those selected pieces from the grid. A graphical animation may be displayed associated with the removal of the randomly-selected game pieces. For example, a "lightning" graphic may be displayed, such as one in which selected pieces may be struck by lightning, after which struck pieces may be removed. In block 520, the gameplay facility awards game points to the player based on the removed game pieces and reinitializes the game for normal gameplay. The re-initialization performed in block 520 should be appreciated from the discussion above of blocks 508 and 516, with a difference being that in block 520 the gameplay facility may reset both scores to zero. Following the reinitializing of block 520, the process 500 ends.

Techniques operating according to the principles described herein may be implemented in any suitable manner. Included in the discussion above are a series of flow charts showing the steps and acts of various processes that enable a secondary gameplay in the context of a group matching game. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 606 of FIG. 6 described below (i.e., as a portion of a computing device 600) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIG. 1A, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

Figure 6:
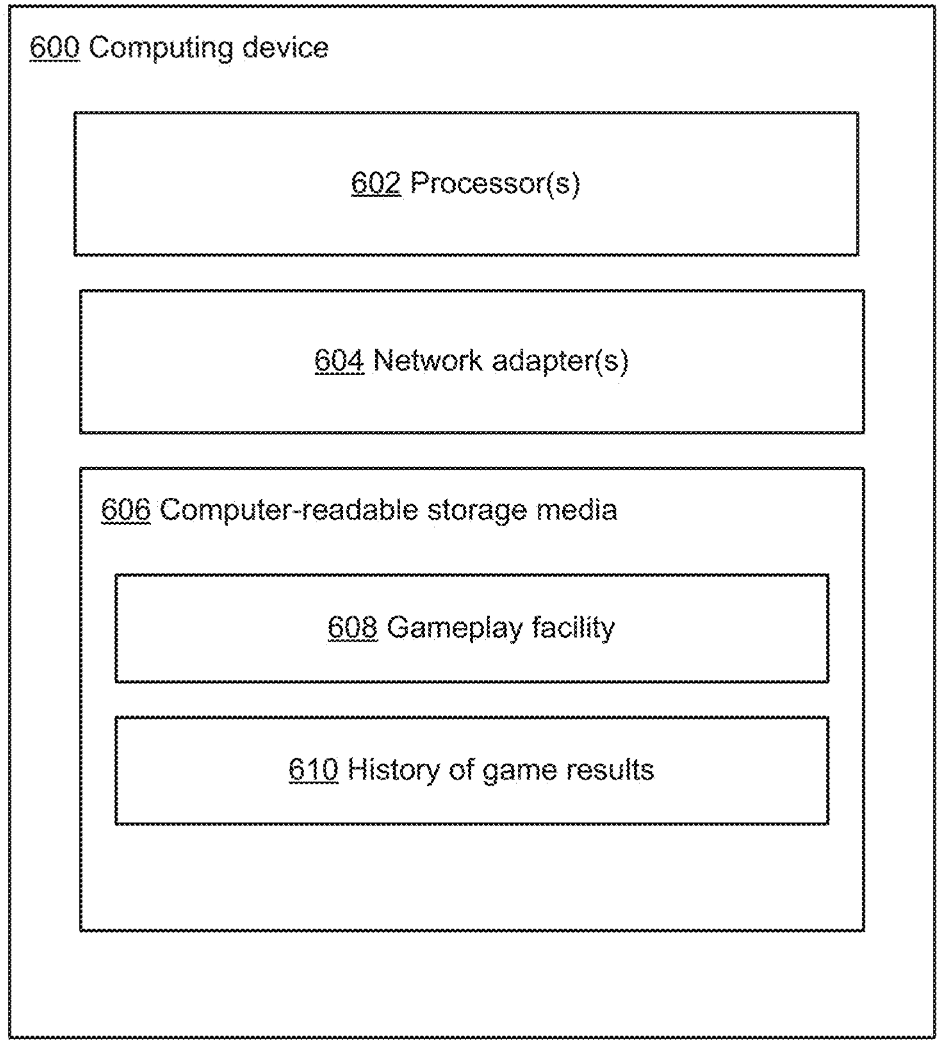
FIG. 6 is a block diagram of some components of a computing device with which some embodiments may operate.

FIG. 6 illustrates one exemplary implementation of a computing device in the form of a computing device 600 that may be used in a system implementing techniques described herein, although others are possible. It should be appreciated that FIG. 8 is intended neither to be a depiction of necessary components for a computing device to operate as a casino game machine in accordance with the principles described herein, nor a comprehensive depiction.

Computing device 600 may comprise at least one processor 602, a network adapter 604, and computer-readable storage media 606. Computing device 600 may be, for example, a desktop or laptop personal computer, a personal digital assistant (PDA), a smart mobile phone, a server, a cabinet-housed game machine, or any other suitable computing device. Network adapter 604 may be any suitable hardware and/or software to enable the computing device 600 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 606 may be adapted to store data to be processed and/or instructions to be executed by processor 602. Processor 602 enables processing of data and execution of instructions. The data and instructions may be stored on the computer-readable storage media 606.

The data and instructions stored on computer-readable storage media 606 may comprise computer-executable instructions implementing techniques which operate according to the principles described herein. In the example of FIG. 6, computer-readable storage media 606 stores computer-executable instructions implementing various facilities and storing various information as described above. Computer-readable storage media 606 may store a gameplay facility 608 and data 610 including a history of prior game results.

While not illustrated in FIG. 6, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A video gaming device of an entertainment system adapted to play a wagering game that offers potential monetary rewards in exchange for wagers, the video gaming comprising:

a gaming display;

at least one slot by which to accept payment of a monetary amount;

at least one processor; and at least one non-transitory computer-readable storage medium having encoded thereon executable instructions that, when executed by the at least one processor, cause the at least one processor to carry out a method, the method comprising operating the video gaming device to carry out acts of:

receiving payment of a monetary amount through the at least one slot of the video gaming device;

generating credits in the video gaming device based on the monetary amount;

in response to receiving user input comprising an amount of a wager for the wagering game, communicating the amount of the wager via at least one network to at least one computing device of the entertainment system, wherein the amount of the wager is at least a portion of the credits generated based on the monetary amount;

controlling the gaming display of the video gaming device to display a grid of game pieces, wherein each game piece in the grid is associated with one characteristic from a first set of characteristics and with either a second characteristic or a third characteristic, wherein each characteristic of the first set of characteristics, the second characteristic, and the third characteristic has a different effect on a display of game pieces in the grid in the gaming display;

in response to determining that an arrangement of game pieces in the grid includes a first set of game pieces that includes at least a threshold number of game pieces, each having a first characteristic, that are disposed adjacent to one another in a chain in the grid, the first characteristic being one of the first set of characteristics that affect display of the game pieces, removing the first set of game pieces from the grid, wherein removing the first set of game pieces comprises controlling the gaming display to present a first animation associated with removal of each game piece of the first set, and awarding a first amount of a monetary reward based at least in part on the wager and the number of game pieces included in the first set;

evaluating each game piece of the first set of game pieces that were removed from the grid to determine which game pieces of the first set have the second characteristic and which game pieces of the first set have the third characteristic;

updating a second characteristic score based on a first number of the game pieces of the first set that have the second characteristic, determined in the evaluating;

updating a third characteristic score based on a second number of the game pieces of the first set that have the third characteristic, determined in the evaluating;

in response to determining that the second characteristic score meets or exceeds a threshold score and the third characteristic score does not meet or exceed the threshold score, removing a second set of game pieces from the grid at least in part by removing from the grid all game pieces in a first row or column of the grid, wherein removing the second set of game pieces comprises controlling the gaming display to present a second animation associated with removal of game pieces of the second set, and awarding a second amount of the monetary reward based at least in part on a number of game pieces included in the second set of game pieces;

in response to determining, with the at least one processor, that the third characteristic score meets or exceeds the threshold score and that the second characteristic score does not meet or exceed the threshold score, removing a third set of game pieces from the grid at least in part by removing from the grid all game pieces in a second row or column of the grid, wherein removing the third set of game pieces comprises controlling the gaming display to present a third animation associated with removal of game pieces of the third set, and awarding a third amount of monetary reward based at least in part on a number of game pieces included in the third set of game pieces;

in response to determining that both the second characteristic score and the third characteristic score meet or exceed the threshold score, removing a randomly-selected set of game pieces from the grid, wherein removing the randomly-selected set of game pieces comprises controlling the gaming display to present a fourth animation associated with removal of game pieces of the randomly-selected set, and awarding a fourth amount of monetary reward based at least in part on a number of game pieces included in the randomly-selected set of game pieces; and communicating a total amount of monetary reward to the at least one other computing device of the entertainment system.

2. The video gaming device of claim 1, wherein:

the method further comprises, in response to detecting that the arrangement of game pieces in the grid includes the first set and following removing of the first set of game pieces from the grid, repeating determining whether the arrangement of game pieces in the grid includes another set of game pieces meeting criteria until it is determined that the arrangement of game pieces does not include any more sets of game pieces meeting the criteria, the criteria being that the set of game pieces includes at least the threshold number of game pieces in which each have a matching characteristic of the first set of characteristics and are disposed adjacent to one another in the grid, and in response to each determination that the arrangement of game pieces in the grid includes another set of game pieces meeting the criteria, removing the other set of game pieces from the grid and awarding an amount of monetary reward based at least in part on the wager and a number of game pieces included in the other set; and evaluating the first set of game pieces to determine how many game pieces of the first set have the second characteristic and evaluating the first set of game pieces to determine how many game pieces of the first set have the third characteristic further comprises evaluating game pieces included in the first set and in each of the other sets determined to meet the criteria to identify game pieces having the second characteristic or the third characteristic.

3. The video gaming device of claim 2, wherein the method further comprises, in response to determining that the arrangement of game pieces does not include any more sets of game pieces meeting the criteria:

rearranging remaining game pieces in the grid to account for removal of game pieces, the rearranging comprising moving game pieces downward in each column of the grid to fill spaces in the grid left by removed game pieces; and inserting new game pieces into the grid at a top of the grid to fill spaces following the rearranging.

4. The video gaming device of claim 3, wherein the rearranging and the inserting are performed prior to the removing the second set of game pieces in response to determining that the second characteristic score meets or exceeds the threshold score and prior to the removing the third set of game pieces in response to determining that the third characteristic score meets or exceeds the threshold score.

5. The video gaming device of claim 1, wherein:

the method further comprises:

in response to determining that the second characteristic score meets or exceeds the threshold score, determining which of the game pieces included in the first row or column have the second characteristic, and for each one of the game pieces in the first row or column that has the second characteristic, additionally removing all game pieces located in the grid within at least a threshold radius of the one game piece;

in response to determining that the third characteristic score meets or exceeds the threshold score, determining which of the game pieces included in the second row or column have the third characteristic, and for each one of the game pieces in the second row or column that has the second characteristic, additionally removing all game pieces located in the grid within at least a threshold radius of the one game piece; and awarding the second amount of monetary reward based at least in part on the number of game pieces included in the second set of game pieces and awarding the third amount of monetary reward based at least in part on the number of game pieces included in the third set of game pieces further comprises awarding an amount of monetary reward based at least in part on a number of game pieces removed in the acts of additionally removing.

6. The video gaming device of claim 5, wherein:

removing from the grid all game pieces in a first row or column of the grid comprises removing all game pieces from a first row of the grid; and removing from the grid all game pieces in a second row or column of the grid comprises removing all game pieces in a second column of the grid.

7. The video gaming device of claim 6, wherein the method further comprises:

at a start of a game, randomly selecting the first row from among the rows of the grid and randomly selecting the second column from among the columns of the grid; and in response to determining that the second characteristic score and/or the third characteristic score exceeds the threshold, randomly selecting the first row from among the rows of the grid and randomly selecting the second column from among the columns of the grid.

8. The video gaming device of claim 7, wherein the method further comprises, following removing of game pieces in response to determining that the second characteristic score and/or the third characteristic score exceeds the threshold:

rearranging remaining game pieces in the grid to account for removal of game pieces, the rearranging comprising moving game pieces downward in each column of the grid to fill spaces in the grid left by removed game pieces;

inserting new game pieces into the grid at a top of the grid to fill spaces following the rearranging to create a new arrangement of game pieces in the grid;

repeating determining whether the new arrangement of game pieces in the grid includes another set of game pieces meeting criteria until it is determined that the new arrangement of game pieces does not include any more sets of game pieces meeting the criteria, the criteria being that the set of game pieces includes at least the threshold number of game pieces, each having a matching characteristic of a first set of characteristics, disposed adjacent to one another in a chain in the grid, and in response to each determination that the new arrangement of game pieces in the grid includes another set of game pieces meeting the criteria, removing the other set of game pieces from the grid and awarding an amount of monetary reward based at least in part on the number of game pieces included in the other set.

9. The video gaming device of claim 1, wherein:

updating a second characteristic score based on the first number of the game pieces of the first set that have the second characteristic, determined in the evaluating, comprises updating display of at least one first graphic based on the second characteristic score; and updating a third characteristic score based on a second number of the game pieces of the first set that have the third characteristic, determined in the evaluating, comprises updating display of at least one second graphic based on the third characteristic score.

10. The video gaming device of claim 9, wherein:

the at least one first graphic shows a first meter associated with the second characteristic score;

updating display of the at least one first graphic based on the second characteristic score comprises adjusting display of the first meter to show an increase in an amount indicated by the first meter;

the at least one second graphic shows a second meter associated with the third characteristic score;

updating display of the at least one second graphic based on the third characteristic score comprises adjusting display of the second meter to show an increase in an amount indicated by the second meter.

11. The video gaming device of claim 1, wherein receiving the payment of the monetary amount through the at least one slot comprises receiving paper money and/or coins.

12. The video gaming device of claim 1, wherein receiving the payment of the monetary amount through the at least one slot comprises receiving a card conveying machine readable information.

13. An apparatus for operation with an entertainment system to play a wagering game that offers potential monetary rewards in exchange for wagers, the apparatus comprising:

at least one processor; and at least one non-transitory computer-readable storage medium having encoded thereon executable instructions that, when executed by the at least one processor, cause the at least one processor to carry out a method, the method comprising:

in response to receiving user input comprising an amount of a wager for the wagering game, communicating the amount of the wager via at least one network to at least one computing device of the entertainment system;

in response to determining that an arrangement of game pieces in a grid includes a first set of game pieces that includes at least a threshold number of game pieces, each having a first characteristic, that are disposed adjacent to one another in a chain in the grid, the first characteristic being one of a first set of characteristics that affect a display of the game pieces, the first set of characteristics comprising a plurality of characteristics, and each game piece being associated with a characteristic of the first set of characteristics, removing the first set of game pieces from the grid, and awarding a first amount of a monetary reward based at least in part on the wager and the number of game pieces included in the first set;

evaluating each game piece of the first set of game pieces that were removed from the grid to determine which game pieces of the first set have a second characteristic and which game pieces of the first set have a third characteristic, wherein game pieces have either the second characteristic or the third characteristic and the second characteristic and third characteristic have a different effect on display of game pieces;

updating a second characteristic score based on a first number of the game pieces of the first set that have the second characteristic, determined in the evaluating;

updating a third characteristic score based on a second number of the game pieces of the first set that have the third characteristic, determined in the evaluating;

in response to determining that the second characteristic score meets or exceeds a threshold score and the third characteristic score does not meet or exceed the threshold score, removing a second set of game pieces from the grid at least in part by removing from the grid all game pieces in a first row or column of the grid, and awarding a second amount of the monetary reward based at least in part on a number of game pieces included in the second set of game pieces;

in response to determining that the third characteristic score meets or exceeds the threshold score and that the second characteristic score does not meet or exceed the threshold score, removing a third set of game pieces from the grid at least in part by removing from the grid all game pieces in a second row or column of the grid, and awarding a third amount of monetary reward based at least in part on a number of game pieces included in the third set of game pieces;

in response to determining that both the second characteristic score and the third characteristic score meet or exceed the threshold score, removing a randomly-selected set of game pieces from the grid, and awarding a third amount of monetary reward based at least in part on a number of game pieces included in the randomly-selected set of game pieces; and communicating a total amount of monetary reward via the at least one network to the at least one computing device of the entertainment system.

14. The apparatus of claim 13, wherein communicating the amount of the wager via the at least one network and communicating the total amount of the monetary reward via the at least one network comprises wirelessly communicating via the at least one network.

15. The apparatus of claim 13, wherein the method further comprises:

adjusting a configuration of the apparatus based at least in part on the amount of the wager.

16. The apparatus of claim 15, wherein adjusting the configuration of the apparatus comprises adjusting at least one parameter controlling likelihood of a win in the wagering game during a subsequent operation of the apparatus.

17. The apparatus of claim 15, wherein adjusting the configuration of the apparatus comprises adjusting at least one parameter controlling a payout for a win in the wagering game during a subsequent operation of the apparatus.

18. The apparatus of claim 15, wherein adjusting the configuration of the apparatus comprises adjusting the configuration based at least in part on one or more prior outcomes of the wagering game.

19. The apparatus of claim 18, wherein adjusting the configuration based at least in part on the amount of the wager and the one or more prior outcomes of the wagering game comprises adjusting the configuration to increase a likelihood of an actual win/loss ratio and/or an actual ratio of total payouts to total wagers over a period of time matching a desired win/loss ratio and/or a desired ratio of total payouts to total wagers over the period of time.

20. At least one non-transitory computer-readable storage medium having encoded thereon executable instructions that, when executed by at least one processor, cause the at least one processor to carry out a method for operation with an entertainment system to play a wagering game that offers potential monetary rewards in exchange for wagers, the method comprising:

in response to receiving user input comprising an amount of a wager for the wagering game, communicating the amount of the wager via at least one network to at least one computing device of the entertainment system;

in response to determining that an arrangement of game pieces in a grid includes a first set of game pieces that includes at least a threshold number of game pieces, each having a first characteristic, that are disposed adjacent to one another in a chain in the grid, the first characteristic being one of a first set of characteristics that affect a display of the game pieces, the first set of characteristics comprising a plurality of characteristics, and each game piece being associated with a characteristic of the first set of characteristics, removing the first set of game pieces from the grid, and awarding a first amount of a monetary reward based at least in part on the wager and the number of game pieces included in the first set;

evaluating each game piece of the first set of game pieces that were removed from the grid to determine which game pieces of the first set have a second characteristic and which game pieces of the first set have a third characteristic, wherein game pieces have either the second characteristic or the third characteristic and the second characteristic and third characteristic have a different effect on display of game pieces;

updating a second characteristic score based on a first number of the game pieces of the first set that have the second characteristic, determined in the evaluating;

updating a third characteristic score based on a second number of the game pieces of the first set that have the third characteristic, determined in the evaluating;

in response to determining that the second characteristic score meets or exceeds a threshold score and the third characteristic score does not meet or exceed the threshold score, removing a second set of game pieces from the grid at least in part by removing from the grid all game pieces in a first row or column of the grid, and awarding a second amount of the monetary reward based at least in part on a number of game pieces included in the second set of game pieces;

in response to determining, with the at least one processor, that the third characteristic score meets or exceeds the threshold score and that the second characteristic score does not meet or exceed the threshold score, removing a third set of game pieces from the grid at least in part by removing from the grid all game pieces in a second row or column of the grid, and awarding a third amount of monetary reward based at least in part on a number of game pieces included in the third set of game pieces;

in response to determining that both the second characteristic score and the third characteristic score meet or exceed the threshold score, removing a randomly-selected set of game pieces from the grid, and awarding a third amount of monetary reward based at least in part on a number of game pieces included in the randomly-selected set of game pieces; and communicating a total amount of monetary reward via the at least one network to the at least one computing device of the entertainment system.

21. A method for operation with an entertainment system to play a wagering game that offers potential monetary rewards in exchange for wagers, wherein the wagering game includes a plurality of game pieces arranged in a grid, the method comprising:

in response to receiving user input comprising an amount of a wager for the wagering game, communicating the amount of the wager to at least one computing device of the entertainment system;

in response to determining that an arrangement of game pieces in the grid includes a first set of game pieces that includes at least a threshold number of game pieces, each having a first characteristic, that are disposed adjacent to one another in a chain in the grid, the first characteristic being one of a first set of characteristics that affect a display of the game pieces, the first set of characteristics comprising a plurality of characteristics, and each game piece being associated with a characteristic of the first set of characteristics, removing the first set of game pieces from the grid, and awarding a first amount of a monetary reward based at least in part on the wager and the number of game pieces included in the first set;

evaluating each game piece of the first set of game pieces that were removed from the grid to identify which game pieces of the first set have a second characteristic and which game pieces of the first set have a third characteristic, wherein game pieces have either the second characteristic or the third characteristic and the second characteristic and third characteristic have a different effect on display of game pieces;

updating a second characteristic score based on a first number of the game pieces of the first set that have the second characteristic, determined in the evaluating;

updating a third characteristic score based on a second number of the game pieces of the first set that have the third characteristic, determined in the evaluating;

in response to determining that the second characteristic score meets or exceeds a threshold score and the third characteristic score does not meet or exceed the threshold score, removing a second set of game pieces from the grid at least in part by removing from the grid all game pieces in a first row or column of the grid, and awarding a second amount of the monetary reward based at least in part on a number of game pieces included in the second set of game pieces;

in response to determining, with the at least one processor, that the third characteristic score meets or exceeds the threshold score and that the second characteristic score does not meet or exceed the threshold score, removing a third set of game pieces from the grid at least in part by removing from the grid all game pieces in a second row or column of the grid, and awarding a third amount of monetary reward based at least in part on a number of game pieces included in the third set of game pieces;

in response to determining that both the second characteristic score and the third characteristic score meet or exceed the threshold score, removing a randomly-selected set of game pieces from the grid, and awarding a third amount of monetary reward based at least in part on a number of game pieces included in the randomly-selected set of game pieces; and communicating a total amount of monetary reward to the at least one computing device of the entertainment system.

* * * * *